United States Patent
Noguchi et al.

(10) Patent No.: US 9,785,283 B2
(45) Date of Patent: Oct. 10, 2017

(54) DISPLAY DEVICE PROVIDED WITH SENSOR AND METHOD OF DRIVING THE SAME

(71) Applicant: Japan Display Inc., Minato-ku (JP)

(72) Inventors: Koji Noguchi, Tokyo (JP); Hiroshi Mizuhashi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 14/601,555

(22) Filed: Jan. 21, 2015

(65) Prior Publication Data

US 2015/0220208 A1    Aug. 6, 2015

(30) Foreign Application Priority Data

Jan. 31, 2014  (JP) .................. 2014-017113
Dec. 25, 2014  (JP) .................. 2014-261969

(51) Int. Cl.
G06F 3/041    (2006.01)
G06F 3/045    (2006.01)
G06F 3/044    (2006.01)

(52) U.S. Cl.
CPC ............ G06F 3/0418 (2013.01); G06F 3/044 (2013.01); G06F 3/045 (2013.01); G06F 3/0412 (2013.01); G06F 2203/04112 (2013.01)

(58) Field of Classification Search
CPC ...... G06F 3/0418; G06F 3/0412; G06F 3/044; G06F 3/045; G06F 2203/04112
See application file for complete search history.

(56) References Cited

U.S. PATENT DOCUMENTS

2009/0256818 A1  10/2009  Noguchi et al.
2010/0182273 A1   7/2010  Noguchi et al.
(Continued)

FOREIGN PATENT DOCUMENTS

JP         2009-244958        10/2009
JP         2009-258182        11/2009
KR    10-2015-0027529 A        3/2015

OTHER PUBLICATIONS

Office Action issued Sep. 9, 2016 in Taiwanese Patent Application No. 104101579 (with English translation).
(Continued)

Primary Examiner — Temesghen Ghebretinsae
Assistant Examiner — Ivelisse Martinez Quiles
(74) Attorney, Agent, or Firm — Oblon, McClelland, Maier & Neustadt, L.L.P.

(57) ABSTRACT

According to one embodiment, a display device with a sensor, includes a pair of electrodes for a touch sensor, which are provided to extend to intersect, and a display panel which includes a plurality of display elements arranged in a matrix, a plurality of gate lines extending along display elements of the display elements which are arranged in a row direction, and a plurality of source lines extending along display elements of the display elements which are arranged in a column direction, wherein a common electrode for display provided in the display panel is also used as one of the electrodes for the touch sensor, the electrodes for the touch sensor are driven by the self-detection method, and an image display operation of the display panel and a drive operation of the electrodes for the touch sensor are performing in a time sharing manner.

5 Claims, 22 Drawing Sheets

(56) References Cited

U.S. PATENT DOCUMENTS

| | | | | |
|---|---|---|---|---|
| 2010/0194695 A1* | 8/2010 | Hotelling | ............... | G06F 3/0412 |
| | | | | 345/173 |
| 2010/0289765 A1* | 11/2010 | Noguchi | ............. | G02F 1/13338 |
| | | | | 345/173 |
| 2012/0050217 A1* | 3/2012 | Noguchi | ............... | G06F 3/0412 |
| | | | | 345/174 |
| 2012/0162104 A1* | 6/2012 | Chang | ................... | G06F 3/0412 |
| | | | | 345/173 |
| 2012/0262387 A1* | 10/2012 | Mizuhashi | .............. | G06F 3/044 |
| | | | | 345/173 |
| 2013/0147724 A1* | 6/2013 | Hwang | ................ | G06F 3/0412 |
| | | | | 345/173 |
| 2013/0250225 A1* | 9/2013 | Maeda | ................ | G02F 1/13338 |
| | | | | 349/143 |
| 2013/0314342 A1* | 11/2013 | Kim | ........................ | G06F 3/041 |
| | | | | 345/173 |
| 2014/0362031 A1* | 12/2014 | Mo | ........................ | G09G 3/36 |
| | | | | 345/174 |
| 2015/0002752 A1* | 1/2015 | Shepelev | ................ | G06F 3/044 |
| | | | | 349/12 |
| 2015/0062062 A1* | 3/2015 | Han | ...................... | G06F 3/0412 |
| | | | | 345/174 |
| 2015/0091843 A1* | 4/2015 | Ludden | ................... | G06F 3/044 |
| | | | | 345/174 |

OTHER PUBLICATIONS

Office Action dated Feb. 20, 2017 in Korean Patent Application No. 10-2015-0013795 (with English translation).
Office Action dated May 2, 2017 in Chinese Patent Application No. 201510047980.5 (with English translation).

* cited by examiner

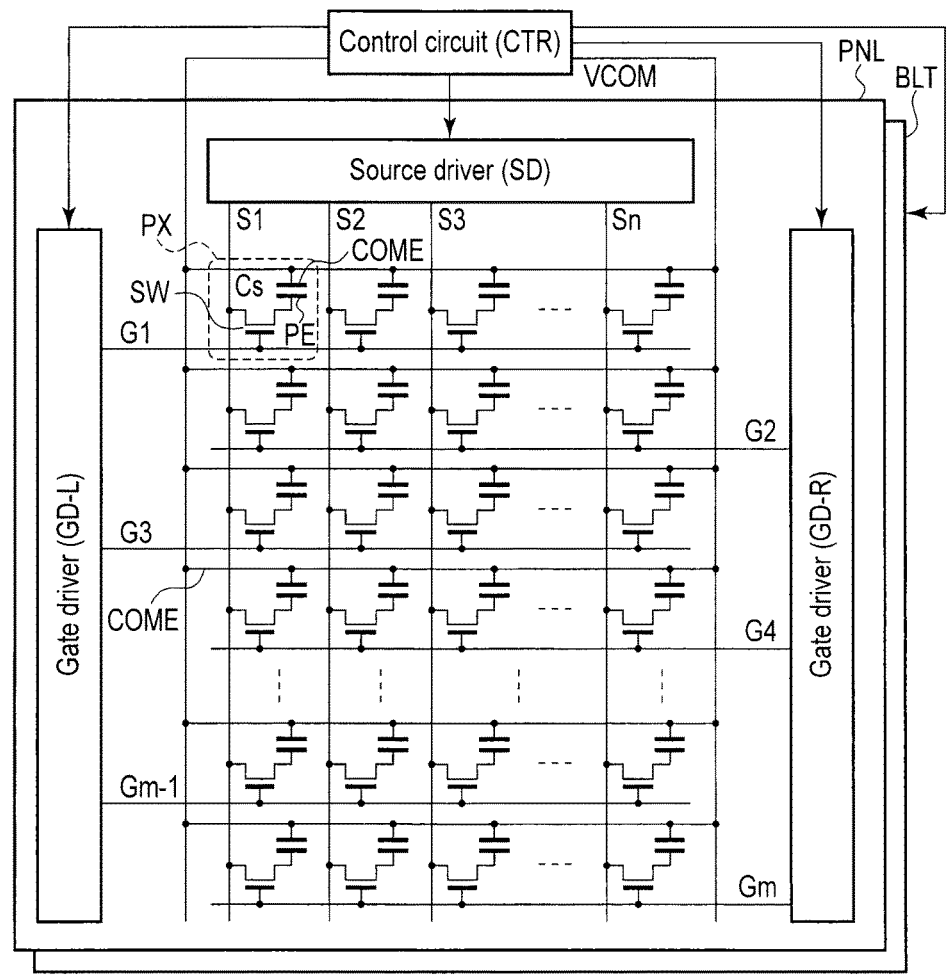
F I G. 1

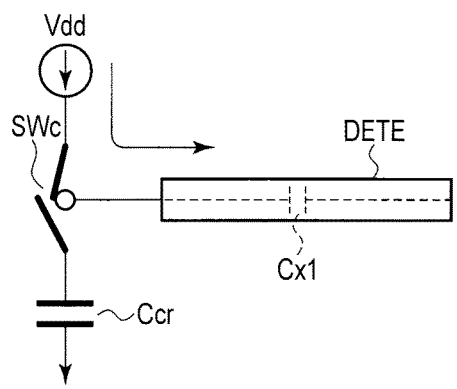 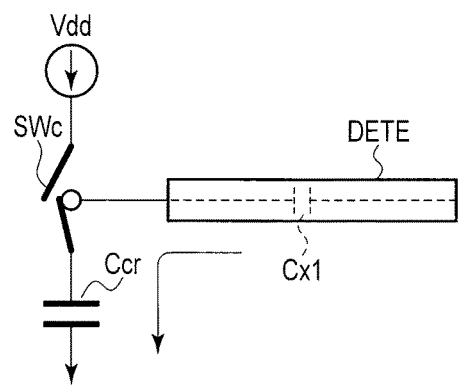
FIG. 3A　　　　　　FIG. 3B
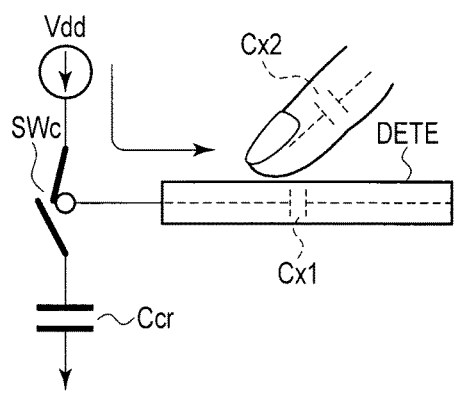 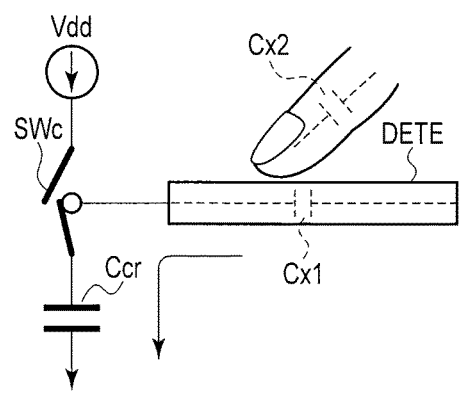
FIG. 4A　　　　　　FIG. 4B

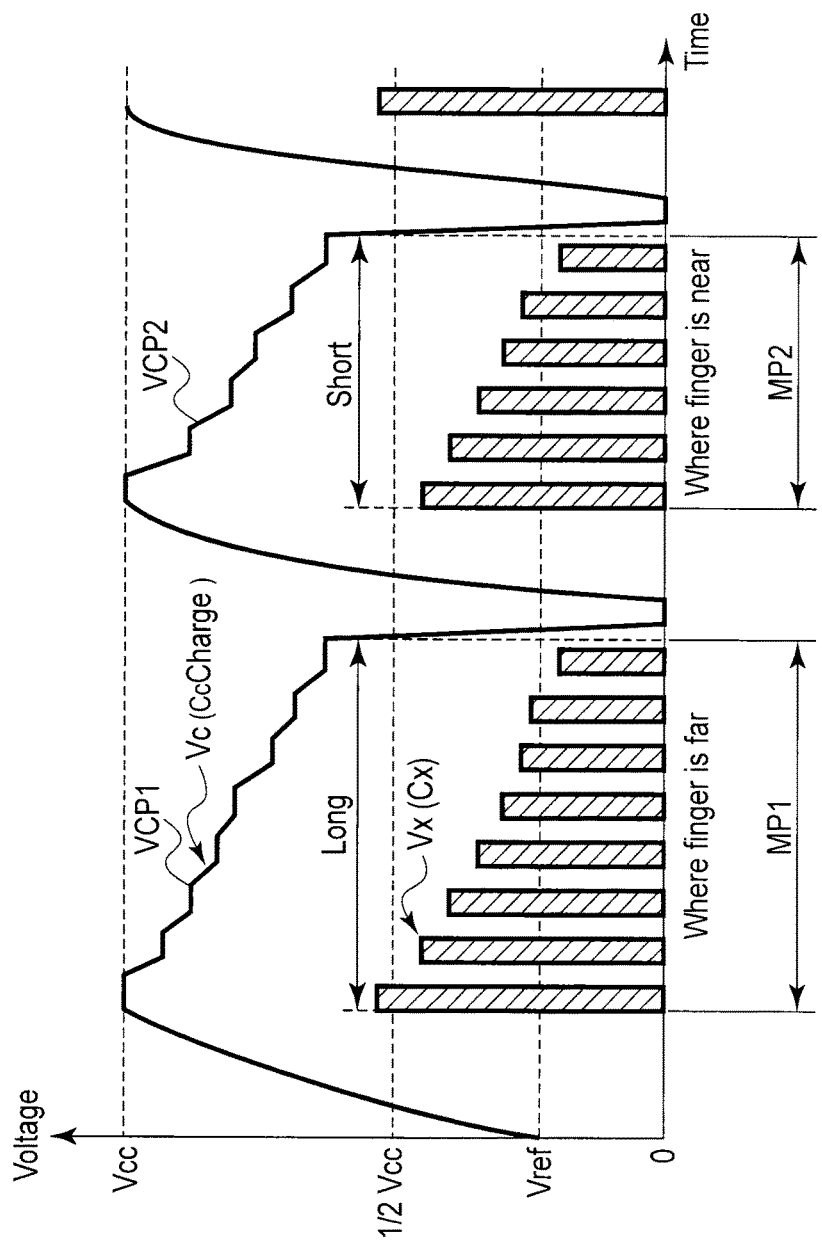
F I G. 7

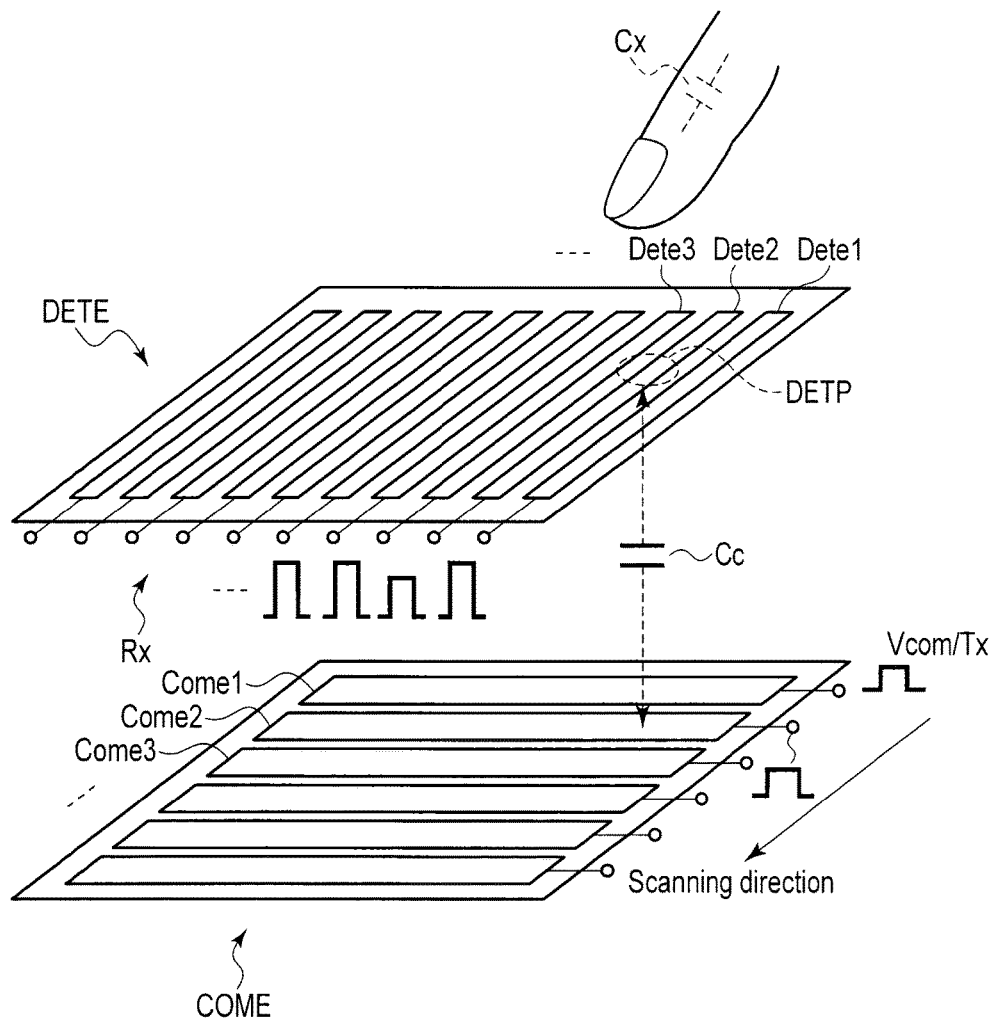
F I G. 8

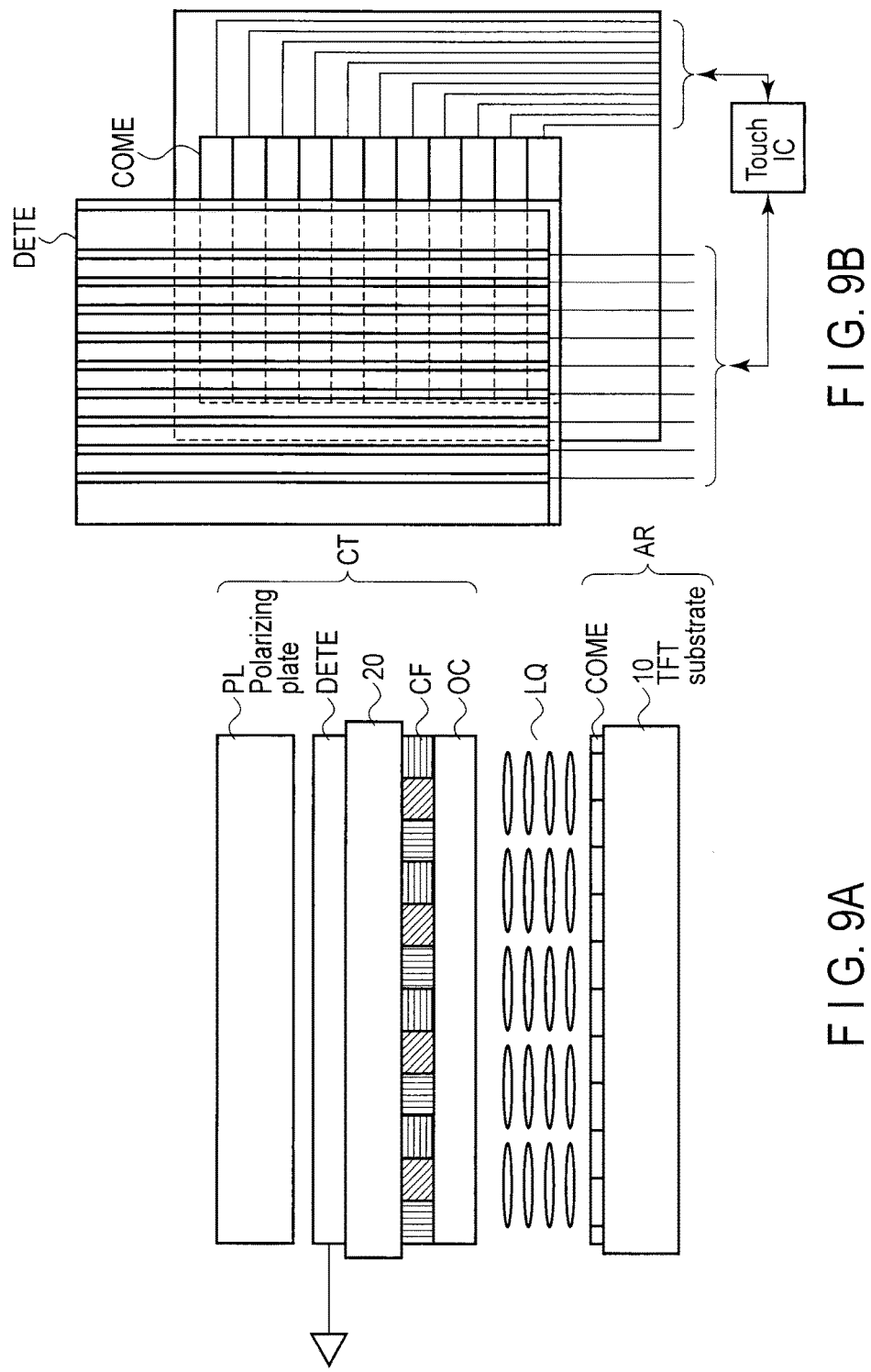

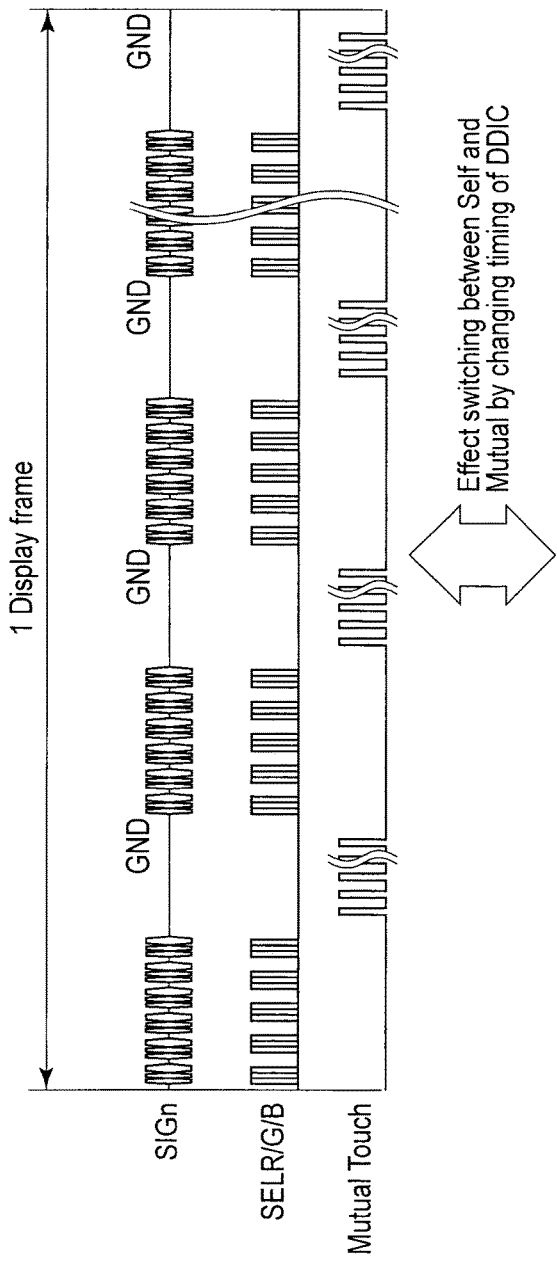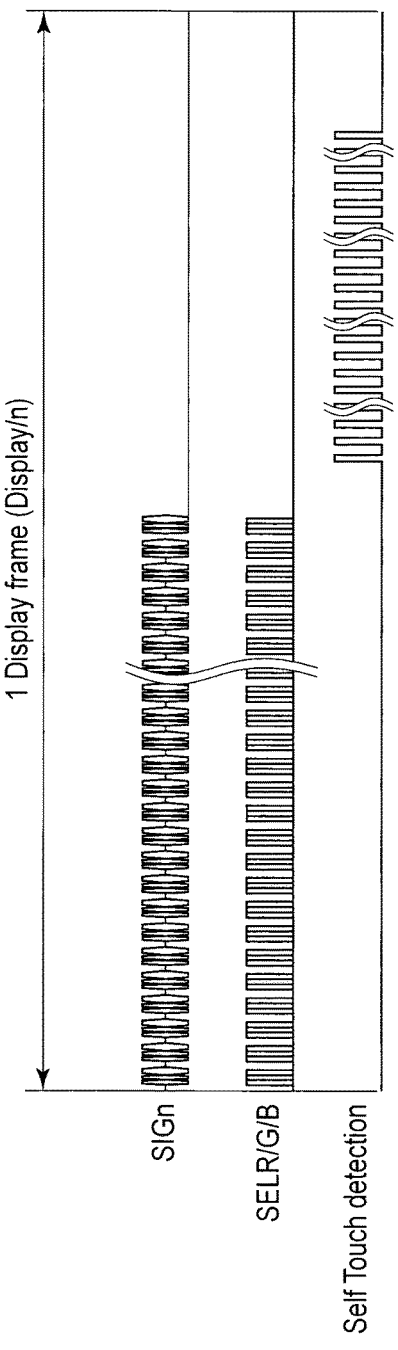
F I G. 10A
F I G. 10B

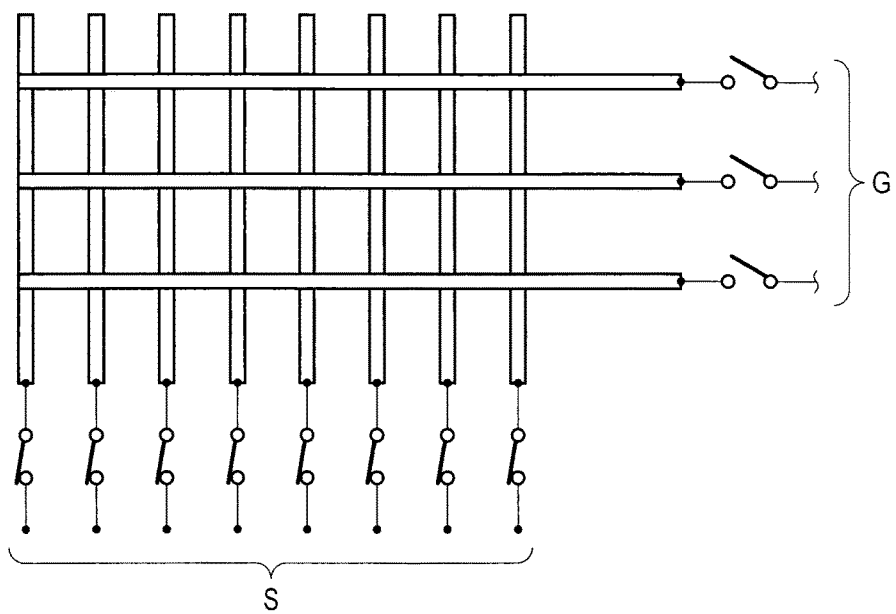
F I G. 13A
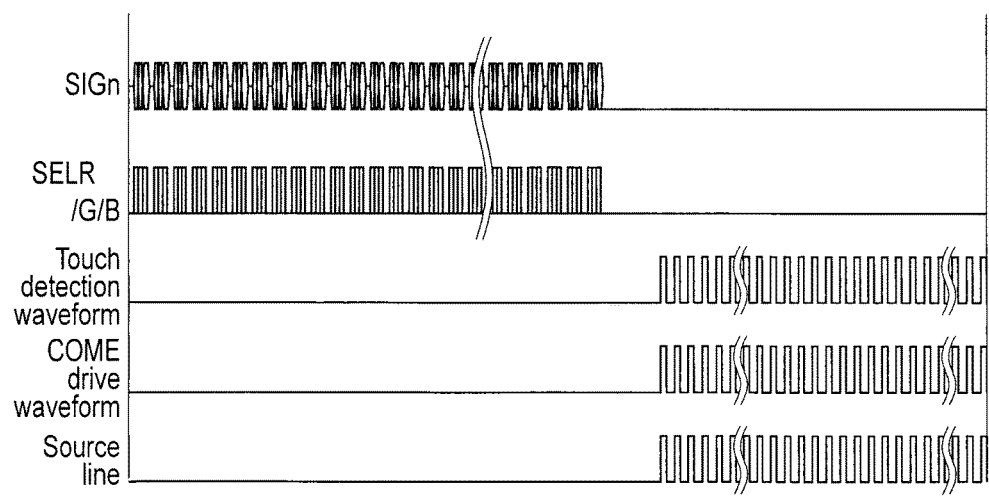
F I G. 13B

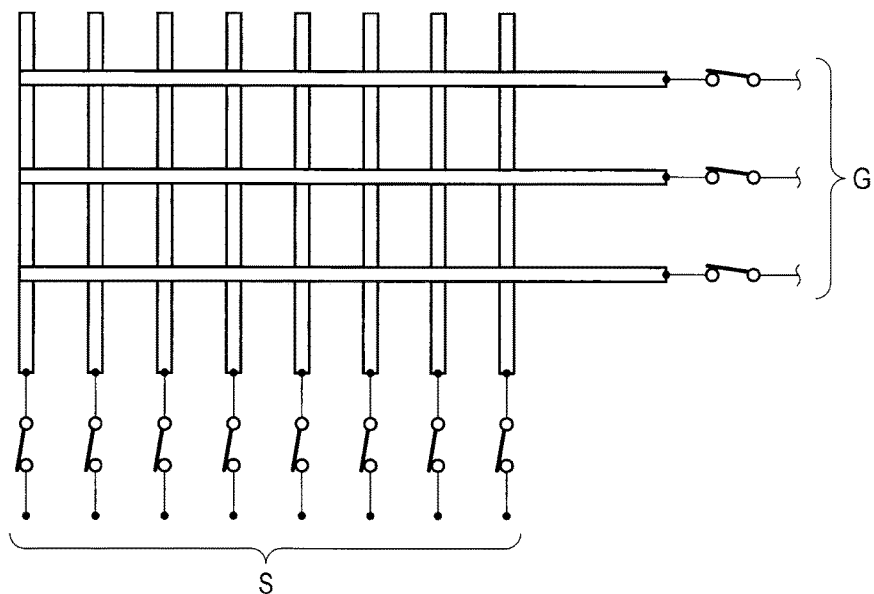
F I G. 14A
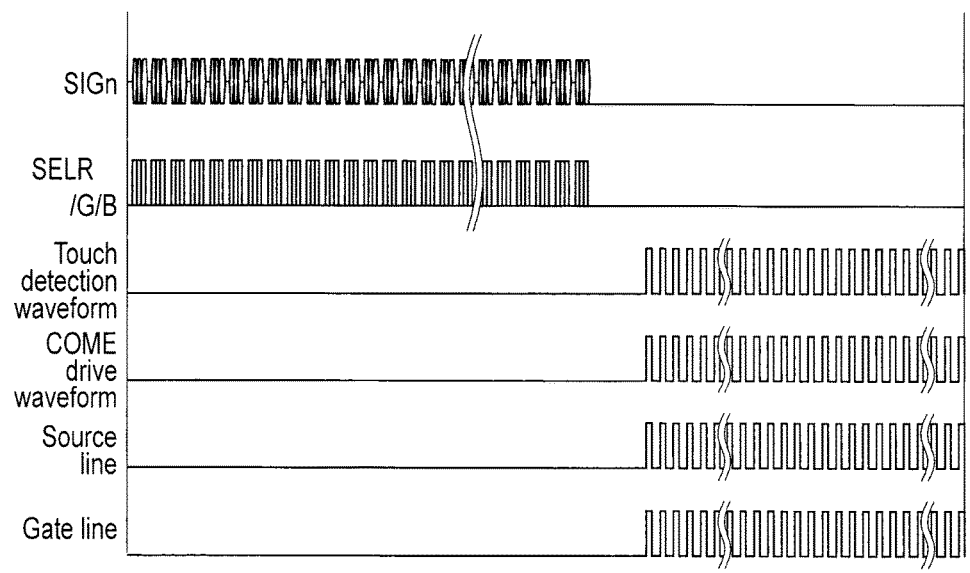
F I G. 14B

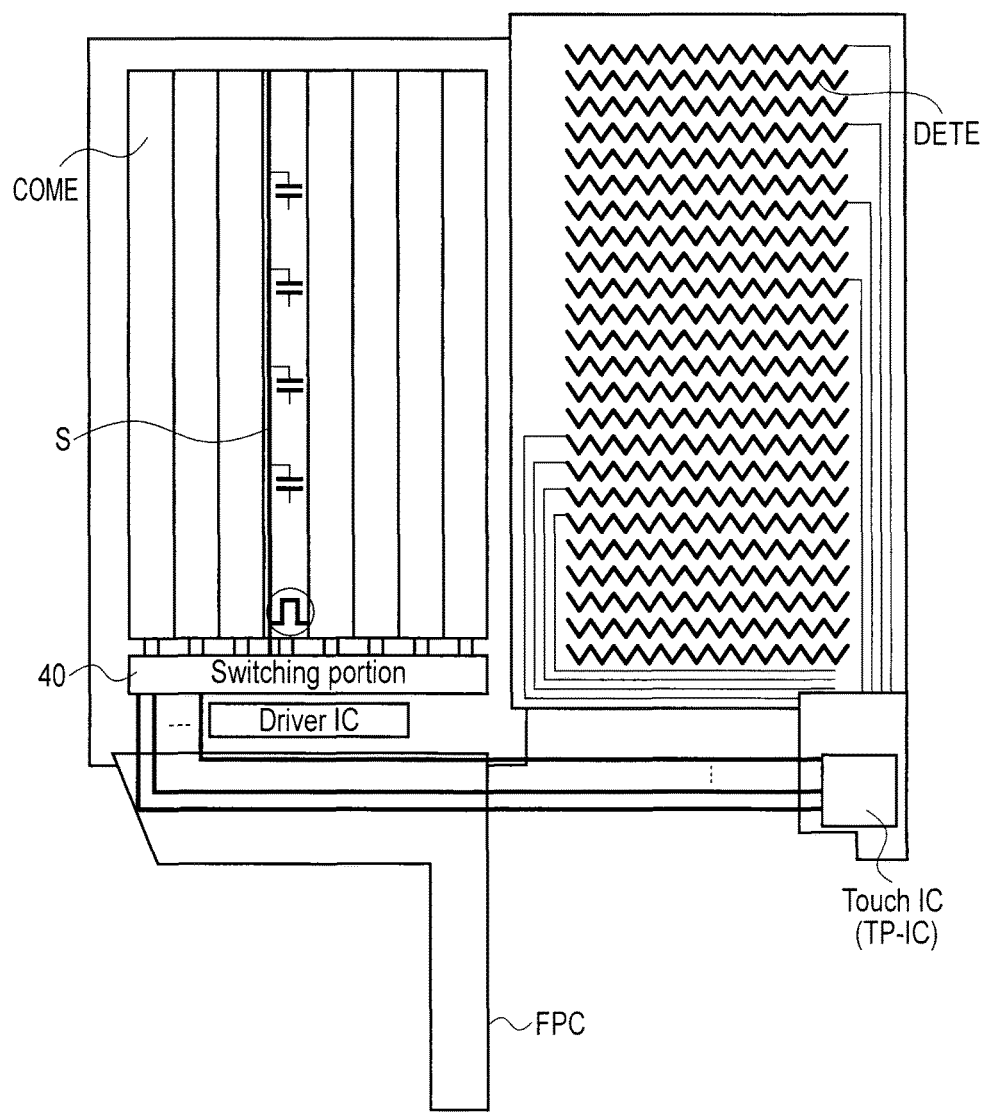
F I G. 15B

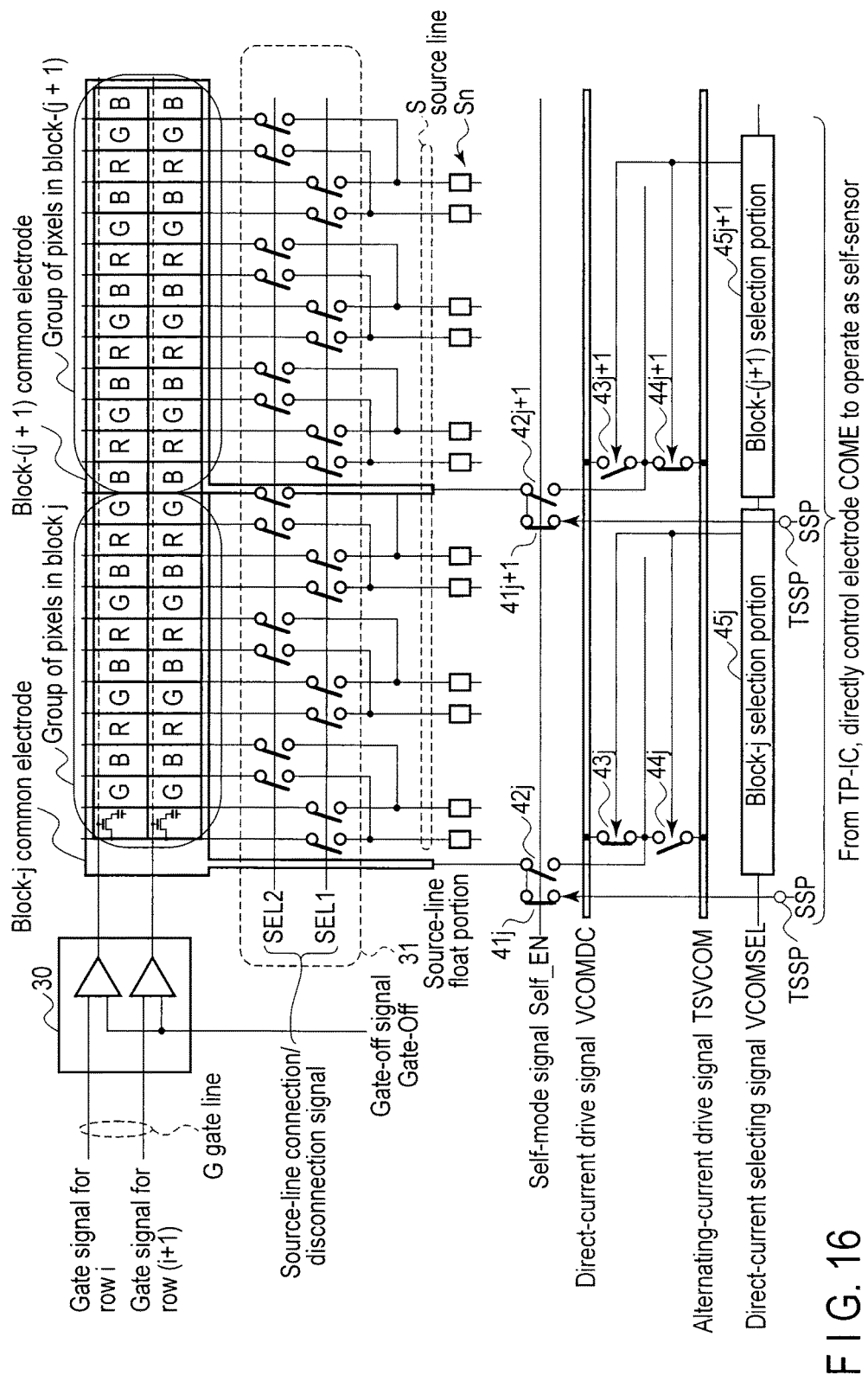
F I G. 16

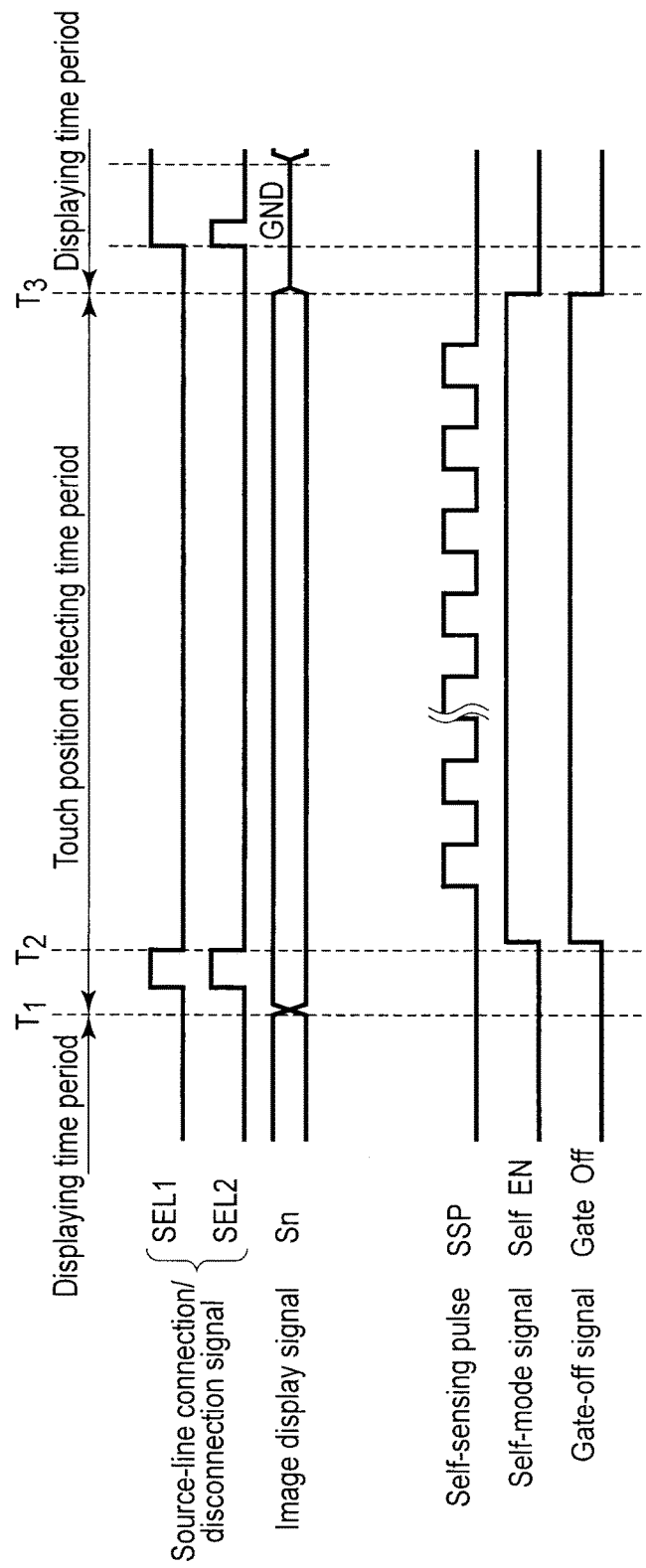
F I G. 17

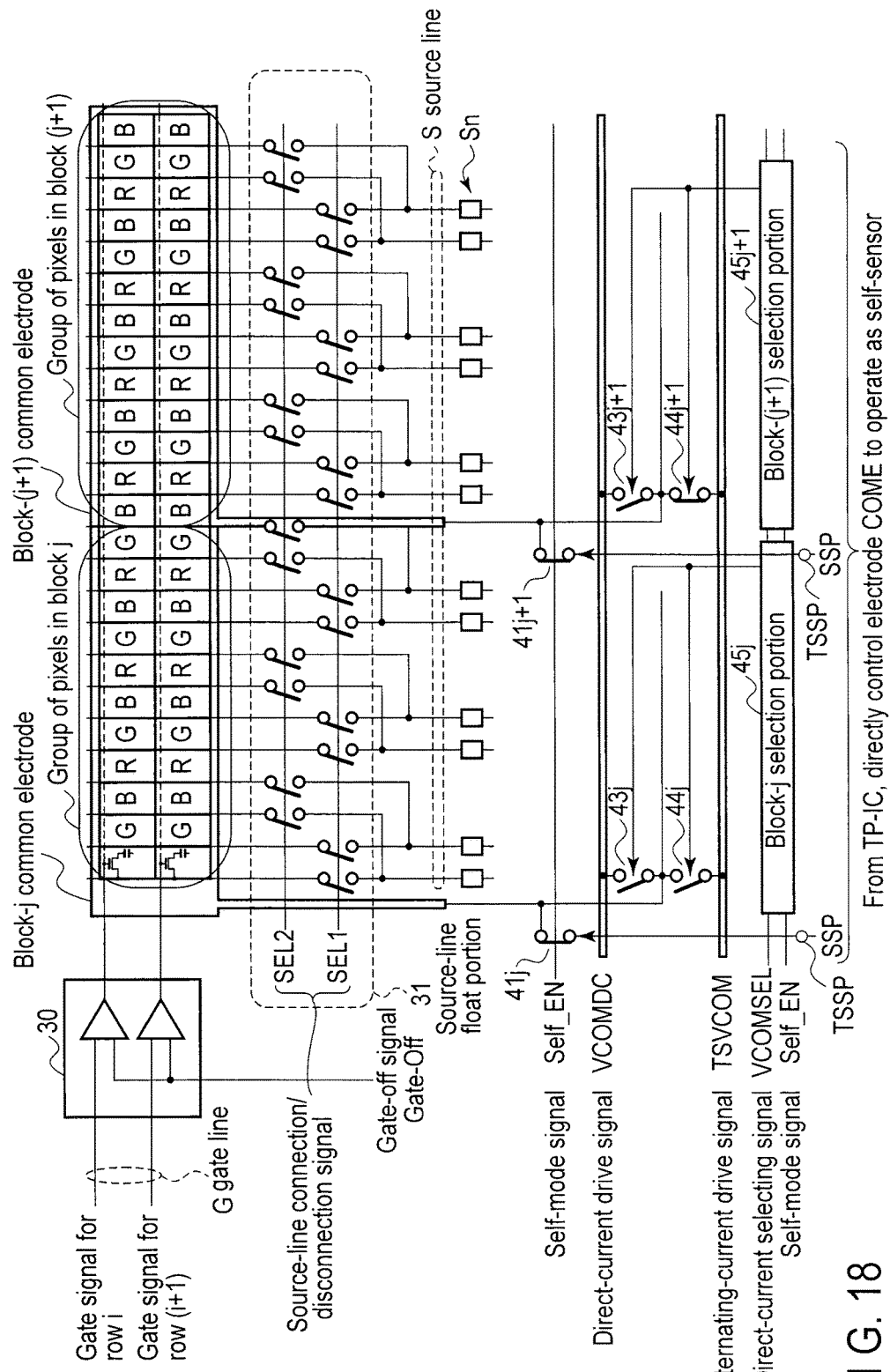
F I G. 18

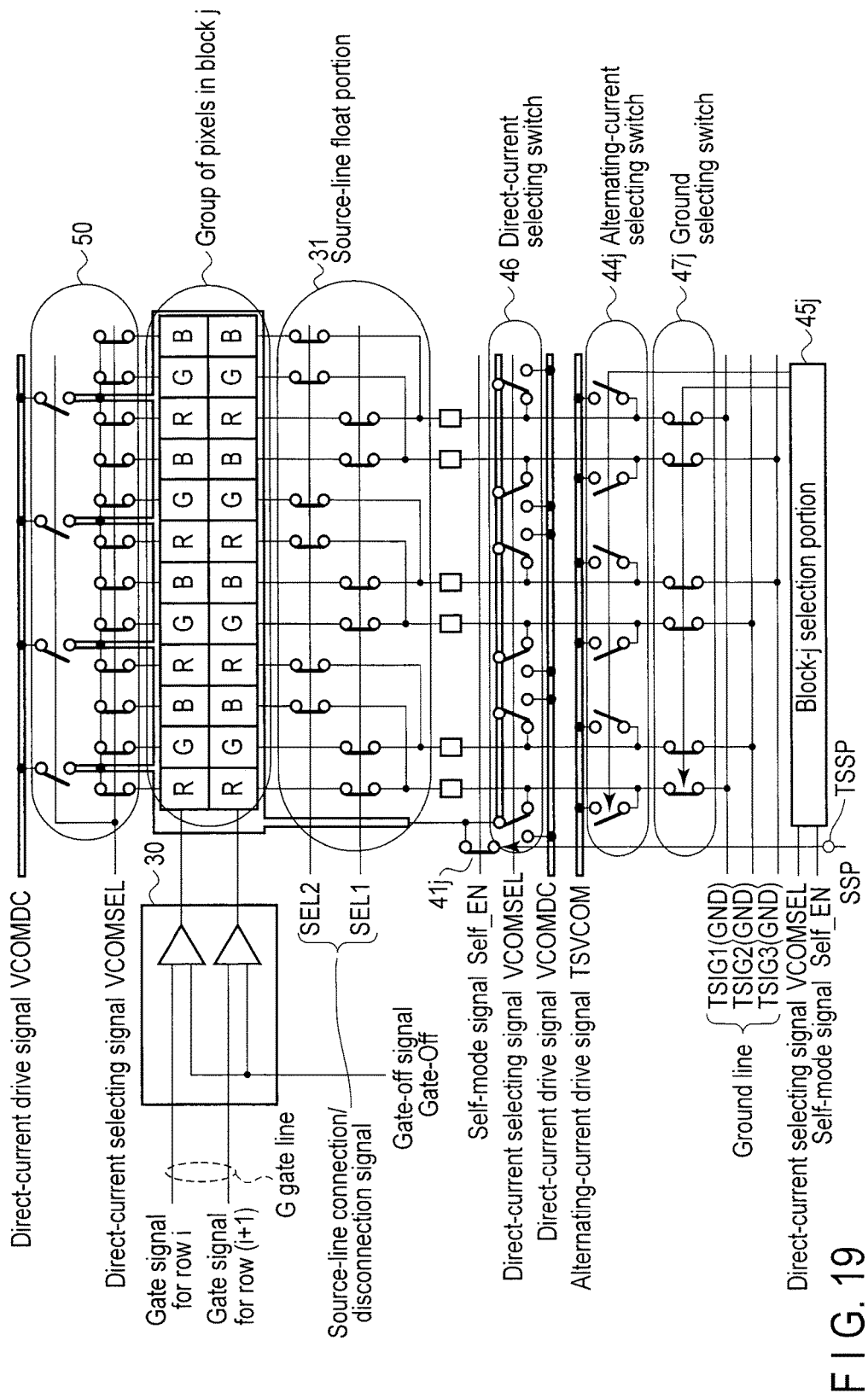
F I G. 19

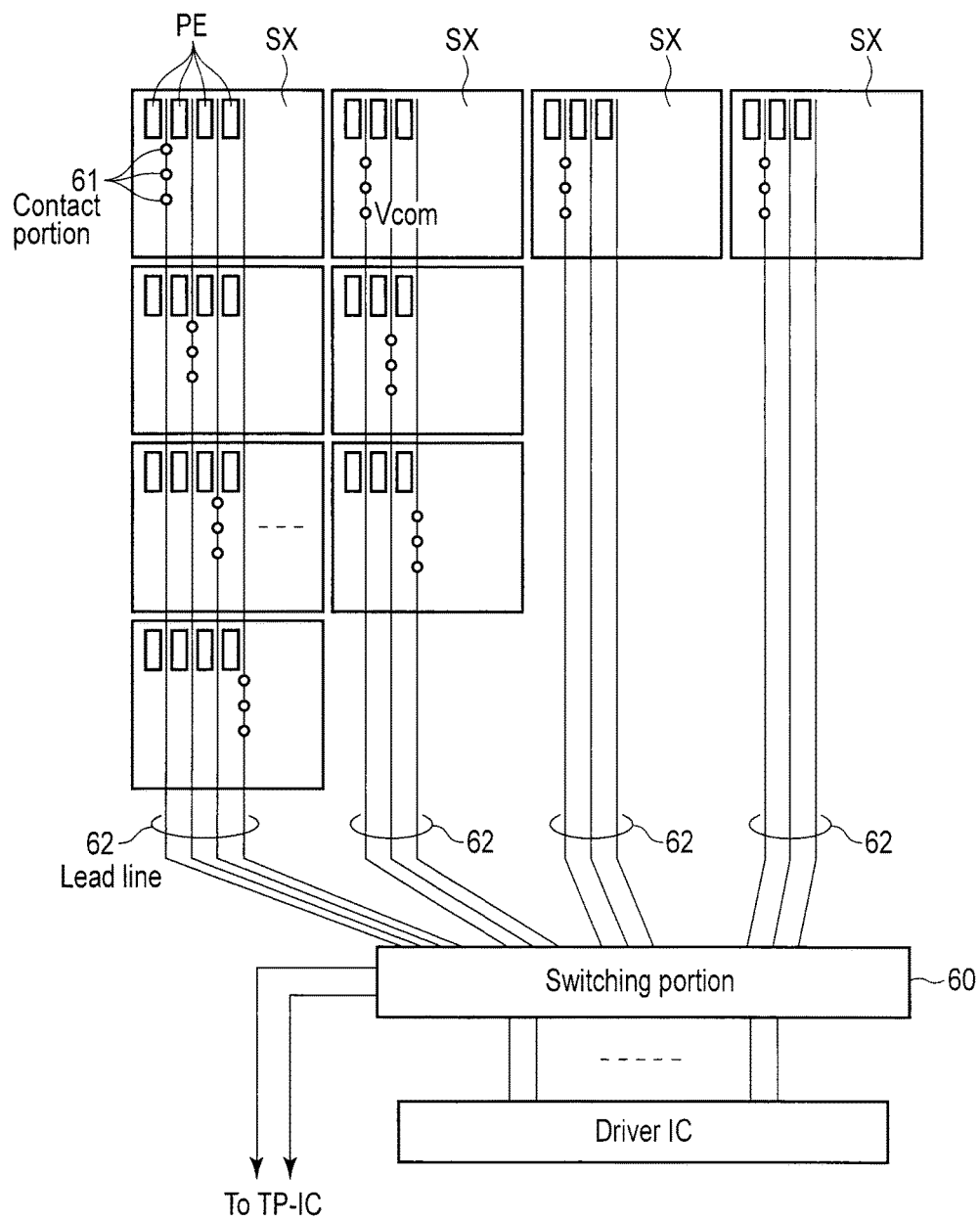
F I G. 22

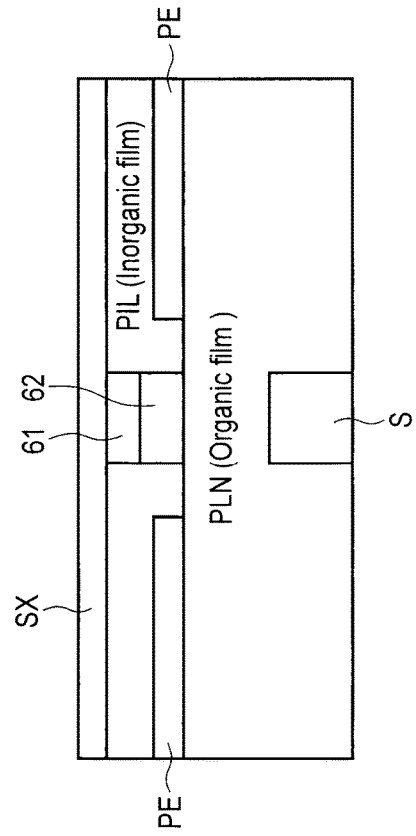
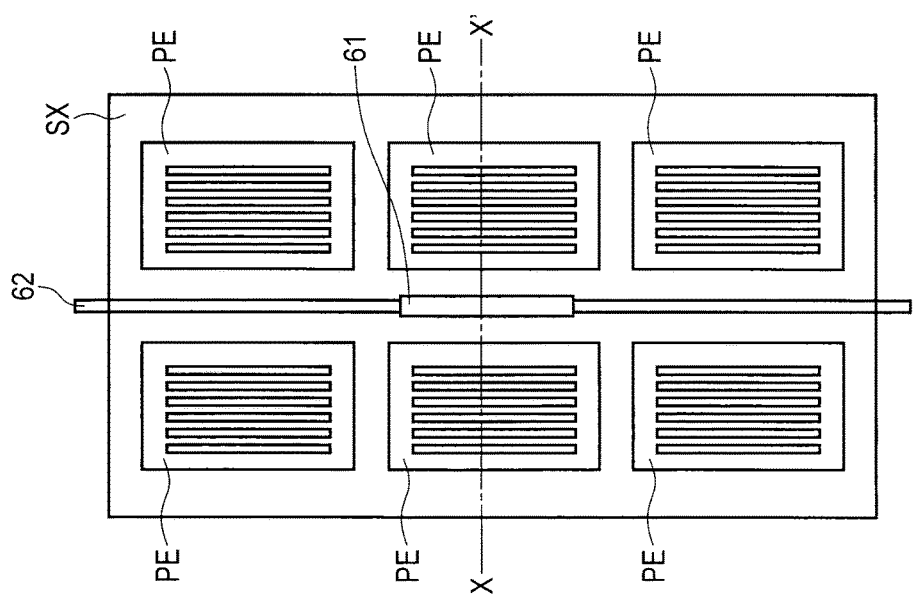
F I G. 23B
F I G. 23A

DISPLAY DEVICE PROVIDED WITH SENSOR AND METHOD OF DRIVING THE SAME

CROSS-REFERENCE TO RELATED APPLICATIONS

This application is based upon and claims the benefit of priority from Japanese Patent Applications No. 2014-017113, filed Jan. 31, 2014; and No. 2014-261969, filed Dec. 25, 2014, the entire contents of all of which are incorporated herein by reference.

FIELD

Embodiments described herein relate generally to a display device provided with a sensor and a method of driving the display device.

BACKGROUND

In recent years, attention has been given to display devices in which a touch detection device referred to as a so-called touch panel is provided on a display device such as a liquid crystal display device, or a touch panel and a display device are integrated as a single body, and the display device is made to display various button images to enable information to be input without ordinary real buttons. Such display devices having a touch detection function do not need input devices such as a keyboard, a mouse and a keypad, and thus tend to be broadly used as display devices of computers, portable information terminals such as cell phones, etc.

As such a touch panel, a capacitive touch panel is known in which a plurality of electrodes each formed to extend in a single direction are intersected to each other. In this touch panel, the electrodes are connected to a control circuit, and when supplied with an excitation current from the control circuit, they detect an object close thereto.

As a display device provided with a touch sensor, a so-called in-cell touch panel is proposed in addition to a so-called on-cell touch panel in which a touch panel is provided on a display surface of a display device. In the in-cell display device, a common electrode for display, which is originally provided in the display device, is also used as one of a pair of electrodes for a touch sensor, and the other of the pair of electrodes (a touch detection electrode) is provided to intersect the common electrode.

Furthermore, as methods of detecting a touch position, a mutual detection method and a self-detection method are known. In the mutual detection method, a drive signal of alternating voltage is input to one of electrodes, and a detection signal generated in the other electrode by the drive signal is processed, to thereby detect a touch position. In the self-detection method, drive signals of alternating voltage are input to electrodes, respectively, and signals generated in the electrodes, respectively, are processed, to thereby detect a touch position.

On the other hand, a technique of performing detection with a high sensitivity has been applied. In this technique, a stylus pen referred to as an active pen which generates static electricity is detected or a finger or the like which is in a floating state in which the finger or the like does not touch a touch panel is detected. In such a manner, in order to detect an object with a high sensitivity, the self-detection method, not the mutual detection method, is more frequently applied.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a view schematically showing a structure of a display device provided with a sensor, according to a first embodiment;

FIG. 3A is a view for explaining a principle of a self-detection method in the display device with the sensor, according to the first embodiment;

FIG. 3B is another view for explaining the principle of the self-detection method in the display device with the sensor, according to the first embodiment;

FIG. 4A is still another view for explaining the principle of the self-detection method in the display device with the sensor according to the first embodiment;

FIG. 4B is a further view for explaining the principle of the self-detection method in the display device with the sensor according to the first embodiment;

FIG. 7 is a view for showing a variation waveform of a voltage of a capacitor and an output waveform of a comparator in the display device with the sensor according to the first embodiment;

FIG. 8 is a view showing a representative basic structure of a mutual detection method of the display device with the sensor, according to the first embodiment;

FIG. 9A is a view schematically showing a structure of the display device with the sensor, according to the first embodiment;

FIG. 9B is another view schematically showing the structure of the display device with the sensor, according to the first embodiment;

FIG. 10A is a view for explaining driving methods of the self-detection method and the mutual detection method in the display device with the sensor, according to the first embodiment;

FIG. 10B is a view for explaining driving methods of the self-detection method and the mutual detection method in the display device with the sensor, according to the first embodiment;

FIG. 13A is a view for explaining another method of reducing the influence of the parasitic capacitance in the self-detection in the display device with the sensor according to the first embodiment;

FIG. 13B is a view for explaining still another method of reducing the influence of the parasitic capacitance in the self-detection in the display device with the sensor according to the first embodiment;

FIG. 14A is a view for explaining a further method of reducing the influence of the parasitic capacitance in the self-detection in the display device with the sensor according to the first embodiment;

FIG. 14B is a view for explaining a still further method of reducing the influence of the parasitic capacitance in the self-detection in the display device with the sensor according to the first embodiment;

FIG. 15B is a plan view schematically showing structures of common electrodes and detection electrodes in the sensor in the display device with the sensor according to the first embodiment;

FIG. 16 is a block diagram showing a structure of a circuit related to signal switching in each of operation modes in the display device with the sensor according to the first embodiment;

FIG. 17 is a timing chart showing an operation of a self-detection mode of the display device with the sensor according to the first embodiment;

FIG. 18 is a block diagram showing a structure of a circuit related to signal switching in each of operation modes in a display device with a sensor according to a modification of the first embodiment;

FIG. 19 is a block diagram showing a structure of a circuit related to signal switching in each of operation modes in a display device with a sensor according to another modification of the first embodiment;

FIG. 22 is a view showing a detailed structure of the sensor of the display device with the sensor according to the second embodiment;

FIG. 23A is an enlarged view showing a detailed structure of the sensor of the display device with the sensor according to the second embodiment; and FIG. 23B is another enlarged view showing the detailed structure of the sensor of the display device with the sensor according to the second embodiment.

DETAILED DESCRIPTION

Figure 2:
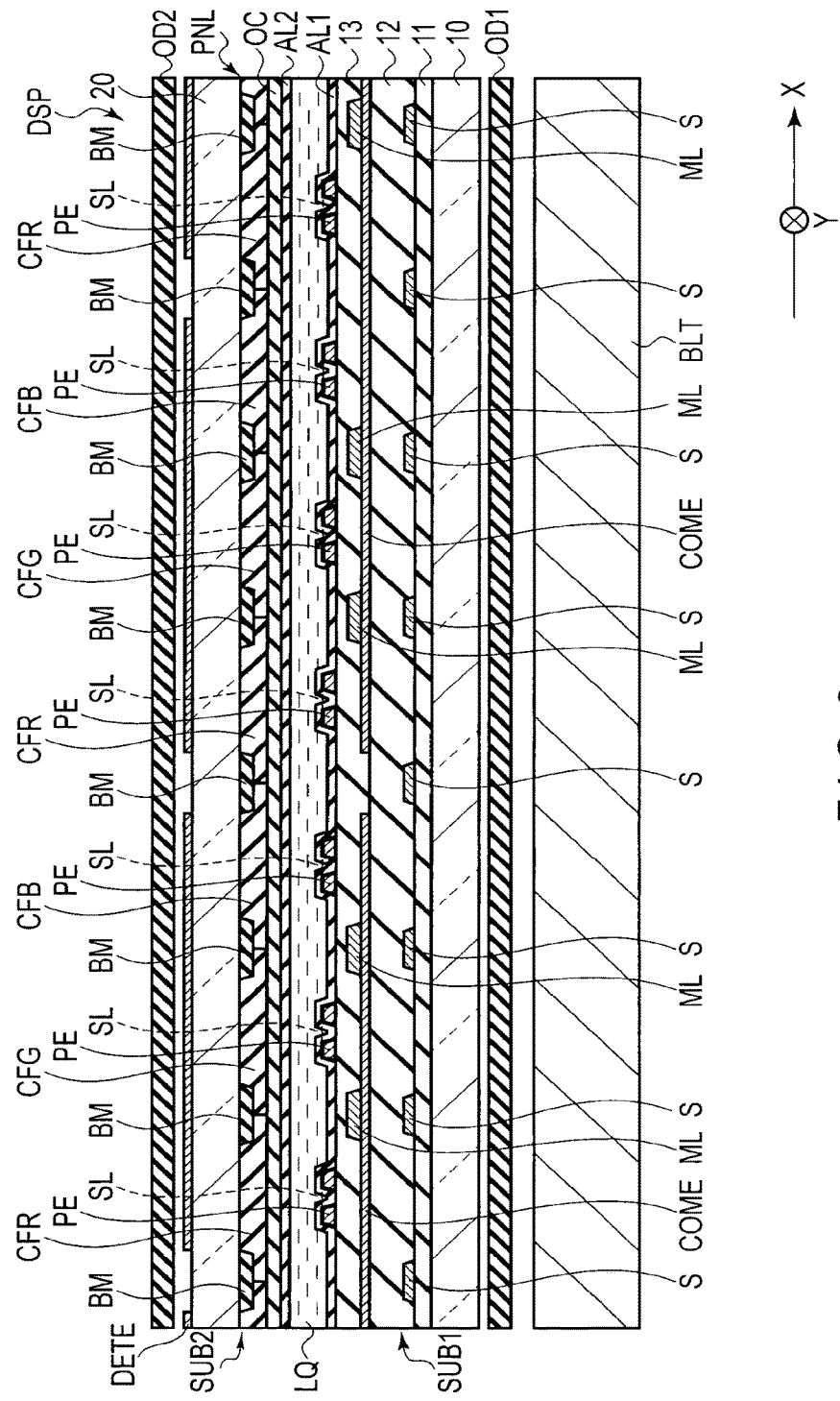
FIG. 2 is a cross-sectional view showing in more detail the display device with the sensor, according to the first embodiment.

Various embodiments will be described hereinafter with reference to the accompanying drawings.

In general, according to one embodiment, a display device with a sensor, includes: a pair of electrodes for a touch sensor, which are provided to extend to intersect; and a display panel which includes a plurality of display elements arranged in a matrix, a plurality of gate lines extending along display elements of the display elements which are arranged in a row direction, and a plurality of source lines extending along display elements of the display elements which are arranged in a column direction, wherein a common electrode for display which is provided in the display panel is also used as one of the electrodes for the touch sensor, and the electrodes for the touch sensor are driven by a self-detection method, and an image display operation of the display panel and a driving operation of the electrodes for the touch sensor are performed in a time sharing manner.

First Embodiment

FIG. 1 is a view schematically showing a structure of a display device DSP provided with a sensor, according to the first embodiment. It should be noted that in the first embodiment, the display device is a liquid crystal display device.

The display device comprises a display panel PNL and a backlight BLT which illuminates the display panel PNL from a rear surface side thereof. The display panel PNL comprises a display portion including display pixels PX arranged in a matrix.

As shown in FIG. 1, the display portion comprises gate lines G (G1, G2, . . . ), source lines S (S1, S2, . . . ) and pixel switches SW, the gate lines G extending along display pixels PX arranged in a row direction, the source lines S extending along display pixels PX arranged in a column direction, and pixel switches PW close to intersections of the gate lines G and the source lines S.

The pixel switches SW comprise thin film transistors (TFTs). Gate electrodes of the pixel switches SW are electrically connected to associated gate lines G. Source electrodes of the pixel switches SW are electrically connected to associated source lines S. Drain electrodes of the switches S are electrically connected to associated pixel electrodes PE.

Furthermore, as drive means for driving the display pixels PX, gate drivers GD (left GD-L and right GD-R) and a source driver SD are provided. The gate lines G are electrically connected to output terminals of the gate drivers GD. The source lines S are electrically connected to output terminals of the source driver SD.

The gate drivers GD and the source driver SD are located in a peripheral area (frame edge) of the display area. The gate drivers GD successively applies on-voltages to the gate lines G to switch on the TFTs, as a result of which the on-voltages are applied to the gate electrodes of pixel switches SW, which are electrically connected to selected scanning lines GL, i.e., the above scanning lines GL. To be more specific, when an on-voltage is applied to a gate electrode, electrical conduction is effected between a source electrode and a drain electrode of a pixel switch SW including the above gate electrode. On the other hand, the source driver SD supplies output signals to the signal lines SL, respectively. To be more specific, when an output signal is supplied to a signal line SL, it is also supplied, through the pixel switch SW in which electrical conduction is effected between its source and drain electrodes, to an associated pixel electrode PE.

Operations of the gate drivers GD and the source driver SD are controlled by a control circuit CTR provided outside the liquid crystal display panel PNL. Furthermore, the control circuit CTR applies a common voltage Vcom to a common electrode COME which will be described later, and also controls an operation of the backlight BLT.

FIG. 2 is a cross-sectional view showing in detail a structure of the display device DSP with the sensor according to the first embodiment.

The display device DSP with the sensor comprises the display panel PNL, the backlight BLT, a first optical element OD1 and a second optical element OD2. In an example shown in the figure, the display panel PNL is a liquid crystal display panel; however, as the display panel PNL, another flat panel such as an organic electroluminescence display panel may be applied. Also, the display panel PNL as shown in the figure has a structure compliant with a lateral electric-field mode applied as a display mode, but may have a structure compliant with other display modes.

The display panel PNL comprises a first substrate SUB1, a second substrate SUB2 and a liquid crystal layer LQ. The first substrate SUB1 and the second substrate SUB2 are stacked together, with a gap provided between them. The liquid crystal layer LQ is held in the gap between the first substrate SUB1 and the second substrate SUB2.

The first substrate SUB1 is formed of a first insulating substrate 10 having a light transmittance characteristic, such as a glass substrate or a resin material. On a side of the first insulating substrate 10 which is located opposite to the second substrate SUB2, the first substrate SUB1 comprises the source lines S, the common electrode COME, the pixel electrodes PE, a first insulating film 11, a second insulating film 12, a third insulating film 13, a first alignment film AL1, etc.

The pixel electrodes PE and the common electrode COME form, along with a pixel area of the liquid crystal layer located between those electrodes, display pixels, which are arranged in the display panel PNL.

The first insulating film 11 is provided on the first insulating substrate 10. It should be noted that although it will not be explained in detail, between the first insulating substrate 10 and the first insulating film 11, the gate lines G, gate electrodes of switching elements, a semiconductor layer, etc., are provided. The source lines S are formed on the first insulating film 11. Also, drain electrodes and source electrodes of the switching elements, etc., are formed on the first insulating film 11. In the example shown in the figure, the source lines S extend parallel to the common electrode COME in a second direction Y.

The second insulating film 12 is provided on the source lines S and the first insulating film 11. The common electrode COME is formed on the second insulating film 12. In the example shown in the figure, the common electrode COME comprises a plurality of segments. The segments of the common electrode COME extend in the second direction Y, and spaced from each other in a first direction X. Such a common electrode COME is formed of a transparent conductive material such as indium tin oxide (ITO) or indium zinc oxide (IZO). It should be noted that in the example shown in the figure, although metal layers ML are formed on the common electrode COME to reduce the resistance of the common electrode COME, they may be omitted.

The third insulating film 13 is provided on the common electrode COME, the metal layers ML and the second insulating film 12. The pixel electrodes PE are formed above the third insulating film 13. Also, each of the pixel electrodes PE is located between associated adjacent two of the source lines S and opposite to the common electrode COME. Furthermore, the pixel electrodes PE include slits SL located opposite to the common electrode COME. Such pixel electrodes PE are formed of transparent conductive material such as ITO or IZO. The first alignment film AL1 covers the pixel electrodes PE and the third insulating film 13.

On the other hand, the second substrate SUB2 is formed of a second insulating substrate 20 having a light transmission characteristic, such as a glass substrate or a resin substrate. On a side of the second insulating substrate 20 which is located opposite to the first substrate SUB1, the second substrate SUB2 comprises black matrixes BM, color filters CFR, CFG and CFB, an overcoat layer OC, a second alignment film AL2, etc.

The black matrixes BM are formed on an inner surface of the second insulating substrate 20, and partition pixels. Color filters CFR, CFG and CFB are also formed on the inner surface of the second insulating substrate 20, and partially stacked on the black matrixes BM. For example, the color filters CFR are red filters; the color filters CFG are green filters; and the color filters CFB are blue filters. The overcoat layer OC covers the color filters CFR, CFG and CFB. Also, the overcoat layer OC is formed of transparent resin material. The second alignment film AL2 covers the overcoat layer OC.

A detection electrode DETE is formed on an outer surface of the second insulating substrate 20. Also, the detection electrode DETE extends in a direction crossing segments of the common electrode COME. In the example shown in the figure, the detection electrode extends in the first direction X. The detection electrode DETE is formed of transparent conducive material such as ITO or IZO.

The backlight BLT is provided on a rear surface side of a display panel LPN. As the backlight BLT, various backlights can be applied, and for example, a backlight employing a light emitting diode (LED) or a cold-cathode fluorescent lamp (CCFL) as a light source can be applied. A detailed explanation of the structure of the backlight BLT will be omitted.

The first optical element OD1 is provided between the first insulating substrate 10 and the backlight BLT. The second optical element OD2 is provided above the detection electrode DETE. Each of the first optical element OD1 and the second optical element OD2 includes at least a polarizing plate, and may include a retardation plate as occasion demands.

Next, a touch sensor applied to the display device DSP with the sensor according to the first embodiment will be explained. As methods of detecting that the user's finger or a pen touches the touch panel or is close to the touch panel, a self-detection method and a mutual detection method are present. Principles of those detection methods will be explained.

[Self-Detection Method]

FIGS. 3A, 3B, 4A and 4B are views for explaining a principle of a self-detection method of the display device DSP with the sensor according to the first embodiment.

FIGS. 3A and 3B show that the touch panel is not touched by the user's finger. FIG. 3A shows that due to switching of a control switch SWc, a power supply Vdd and the detection electrode DETE are connected to each other, and the detection electrode DETE is not connected to a capacitor Ccr. In this state, the detection electrode DETE, which has a capacitance Cx1, is charged. FIG. 3B shows that due to switching of the control switch SWc, the power supply Vdd and the detection electrode DETE are disconnected from each other, and the detection electrode DETE and the capacitor Ccr are connected to each other. In this state, the detection electrode DETE having the capacitance Cx1 is discharged through the capacitor Ccr.

FIGS. 4A and 4B show that the touch panel is touched by the finger of the user. FIG. 4A shows that due to switching of the control switch SWc, the power supply Vdd and the detection electrode DETE are connected to each other, and the detection electrode DETE is not connected to the capacitor Ccr. In this state, not only the detection electrode having the capacitance Cx1, but a user's finger close to the detection electrode DETE to thus have a capacitance Cx2 is charged. FIG. 4B shows that due to switching of the control switch SWc, the power supply Vdd and the detection electrode DETE are disconnected from each other, and also the detection electrode DETE and the capacitor Ccr are connected to each other. In this state, the detection electrode having the capacitance Cx1 and the finger having the capacitance Cx2 are both discharged through the capacitor Ccr.

It should be noted that due to the presence of the capacitance Cx2, a voltage variation characteristic of the capacitor Ccr at the time of discharge as shown in FIG. 4B (in the case where the finger touches the panel) clearly differs from that of the capacitor Ccr the time of discharge as shown in FIG. 3B (in the case where the finger does not touch the panel). Therefore, in the self-detection method, based on variation of the voltage variation characteristic of the capacitor Ccr which occurs in accordance with the presence or absence of the capacitance Cx2, it is determined whether an input operation of the finger or the like is performed or not.

Figure 5:
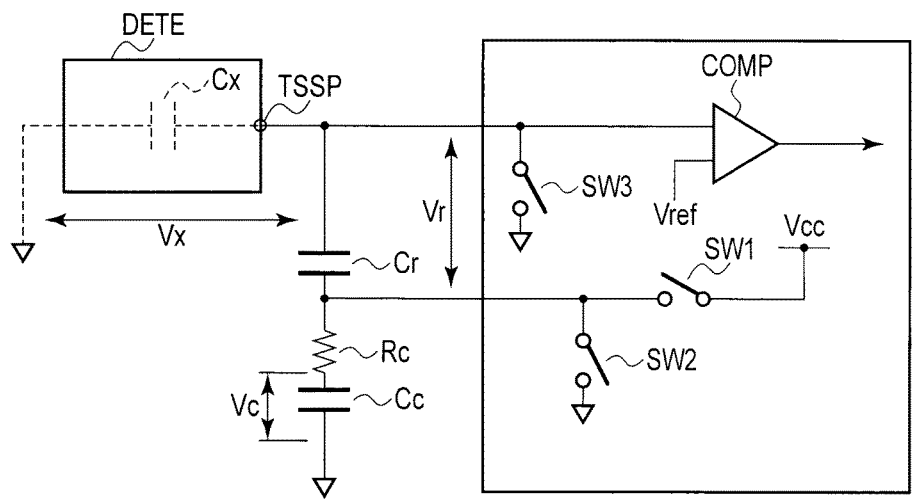
FIG. 5 is a view showing an example of a basic circuit for achieving the self-detection method in the display device with the sensor according to the first embodiment.

FIG. 5 is a view showing an example of a basic circuit which achieves the self-detection method in the display device DSP with the sensor according to the first embodiment.

The detection electrode DETE is connected to one of terminals of a capacitor Cr for voltage division and one of input terminals of the comparator COMP. The detection electrode DETE has a self-capacitance Cx. For example, the detection electrode DETE having the self-capacitance Cx is supplied with a self-sensing pulse (SSP) from a touch IC (TP-IC) through a self-sensing pulse terminal TSSP of the display device DSP with the sensor. In the first embodiment, for example, on/off signals of switches SW2 and SW3 are self-sensing pulses (SSPs). The other input terminal of the comparator COMP is connected to a supply terminal for a comparison voltage Vref.

In order to simplify an explanation, the detection electrode DETE will be referred to as a capacitor Cx having a capacitance Cx.

The other terminal of the capacitor Cr is connected to a power supply line of a voltage Vcc through a switch SW1, and also connected to one of terminals of a capacitor Cc through a resistor Rc. The other terminal of the capacitor Cc is connected to a reference potential (e.g., a ground potential).

The switch SW2 is connected to the reference potential and the above other terminal of the capacitor Cr, and the switch SW3 is connected between the reference potential and the above one of the terminals of the capacitor Cr. The switches SW1, SW2 and SW3 and the comparator COMP are provided in the control circuit.

Next, an operation will be explained. The switch SW1 is closed (i.e., made in the on state) at regular intervals to enable the capacitor Cc to be charged. At the time of charging the capacitor Cc, the switches SW2 and SW3 are opened (i.e., made in the off state). When the capacitor Cc has been charged, the switches SW1, SW2 and SW3 are all opened (to be in the off state) to cause charge in the capacitor Cc to be held therein.

Then, the switches SW2 and SW3 are kept closed (in the on state) for a given time period (whereas the switch SW1 is kept open (in the off state)). As a result, the capacitors Cr and Cx are almost completely discharged, and the capacitor Cc is partially discharged through the resistor Rc.

Subsequently, the switches SW1, SW2 and SW3 are all opened (to be in the off state). As a result, charge in the capacitor Cc moved to the capacitors Cr and Cx. In the comparator COMP, a voltage Vx of the capacitor Cx is compared with a comparison voltage (or a threshold voltage) Vref.

Figure 6:
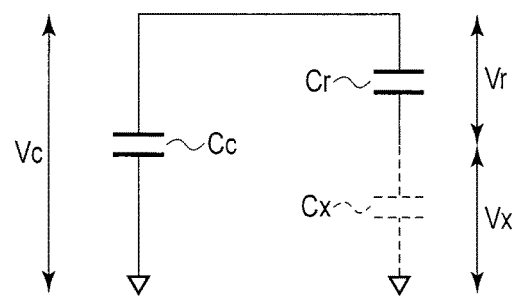
FIG. 6 is a view showing an equivalent circuit in the case where a switch of the display device with the sensor according to the first embodiment is closed or opened.

FIG. 6 is a view showing an equivalent circuit in the case where the switches SW1, SW2 and SW3 in the display device DSP with the sensor according to the first embodiment are closed and opened.

As shown in FIG. 6 showing the equivalent circuit, when the switches SW1, SW2 and SW3 are all turned off, charge in the capacitor Cc moves to the capacitors Cr and Cx, and then variation of the voltage Vx of the capacitor Cx is repeatedly compared with the comparison voltage Vref in the comparator COMP.

To be more specific, the following operation is repeatedly performed.

The switches SW2 and SW3 are kept on for a given time period (whereas the switch SW1 is kept off). As a result, the capacitors Cr and Cx are almost completely discharged, and the capacitor Cc is partially discharged thorough the resistor Rc. Then, the switches SW1, SW2 and SW3 are all turned off. Consequently, charge in the capacitor Cc moves to the capacitors Cr and Cx.

A relationship between the voltages Vr, Vc and Vx and the capacitors Cr, Cc and Cx is expressed by the following equations (1)-(3):

$$Vc = Vr + Vx \quad (1)$$

$$Vr:Vx = (1/Cr):(1/Cx) \quad (2)$$

$$Vx = (Cr/(Cr+Cx)) \times Vc \quad (3)$$

As described above, after the capacitor Cc is charged to the voltage Vc through the switch SW1, when the switches SW1 and SW2 are repeatedly closed and opened, the voltage Vc is gradually reduced, and the voltage Vx of the capacitor Cx is also reduced. This operation, i.e., an operation in which after the capacitor Cc is charged to the voltage Vc, the switches SW2 and SW3 are repeatedly closed and opened, is continuously performed until the voltage Vx is decreased to be less than the threshold voltage Vref.

FIG. 7 is a view showing a variation waveform of the voltage Vc of the capacitor Cc and an output waveform of the comparator COMP in the display device DSP with the sensor according to the first embodiment. A horizontal axis and a vertical axis of a coordinate system as shown in FIG. 7 indicate time and voltage, respectively.

When the switch SW1 is closed (to be in the on state), the capacitor Cc is charged in accordance with time constants of the capacitor Cc and the resistor Rc until the voltage Vc of the capacitor Cc reaches the voltage Vcc. Thereafter, the switches SW1, SW2 and SW3 are all opened (to be in the off state), and charge in the capacitor Cc moves to the capacitor Cr and Cx. Then, the variation of the voltage Vx of the capacitor Cx is compared with the comparison voltage Vref in the comparator COMP.

The characteristic of variation of the voltage Vc or the degree of conversion thereof changes in accordance with the total capacitance of the capacitor Cr and Cx. That is, the greater the total capacitance of the capacitor Cr and Cx, the larger the amount of charge which moves from the capacitor Co to the capacitor Cr and Cx when the switches SW2 and SW3 are opened (to be in the off state), and thus the greater the reduction of the voltage Vc. Also, the capacitance Cx varies with the proximity of the user's finger to the detection electrode DETE.

Therefore, as shown in FIG. 7, when the finger of the user is far from the detection electrode DETE, the voltage Vc slowly varies as indicated by a characteristic VCP1, and when the finger is close to the detection electrode DETE, the voltage rapidly varies as indicated by a characteristic VCP2.

When the finger is close to the detection electrode DETE, the rate of reduction of the voltage Vc is great, as compared with that when the finger is far from the detection electrode DETE, since the capacitance of the finger is added to the capacitor Cc.

The comparator COMP compares a voltage Vr with the threshold voltage Vrer in synchronism with repetitive switching between closing and opening of the switches SW2 and SW3. Then, when the voltage Vr is greater than the threshold voltage Vref (Vr>Vref), the comparator COMP obtains output pulses. However, the comparator COMP stops output pulses when the voltage Vr becomes less than the threshold voltage Vref (Vr<Vref).

The output pluses of the comparator COMP are monitored by a measurement application or a measurement circuit not shown. That is, after the capacitor Cc is charged once, discharge is repeatedly carried out for short time with the switches SW2 and SW3, and the voltage Vr is repeatedly measured. At this time, a time period (MP1 or MP2) in which on output of the comparator COMP is obtained may be measured, or the number of output pulses of the comparator COMP (the number of pulses which are output from charging of the capacitor Cc until the voltage Vr becomes less than a voltage Vth (Vr<Vth)) may be measured.

When the user's finger is far from the detection electrode DETE, the above time period is long, and when the finger is close to the detection electrode DETE, the time period is short. Also, when the finger is far from the detection electrode DETE, the above number of pulses output from the comparator COMP is large, and when the finger is close to the detection electrode DETE, the number of pulses output from the comparator COMP is small.

Therefore, based on the number of pulses detected, it is possible to determine how close the finger is to the flat surface of the touch panel. Also, detection electrodes included in the detection electrode DETE are arranged in a two-dimensional manner (matrix), and can thus detect a two-dimensional position of the finger on the flat surface of the touch panel.

As described above, it is detected whether or not the finger of the user influences the detection electrode DETE. The time required for the above detection is, e.g., a few hundred of microseconds to the order of a few milliseconds, as described above.

[Mutual Detection Type]

FIG. 8 is a view showing a representative basic structure of a mutual detection type of display device DSP with the sensor according to the first embodiment. The common electrode COME and the detection electrode DETE are used. The common electrode COME includes a plurality of common electrodes Come1, Come2, Come3, . . . arranged in the manner of stripes. The common electrodes Come1, Come2, Come3, . . . are also arranged in a scanning (driving) direction (a Y direction or an X direction).

The detection electrode DETE includes a plurality of detection electrodes Dete1, Dete2, Dete3, . . . arranged in the manner of stripes (which are thinner than the common electrodes arranged in the manner of stripes). The detection electrodes Dete1, Dete2, Dete3 . . . are also arranged in a direction (the X direction or the Y direction) crossing the common electrodes Come1, Come2, Come3, . . . .

The common electrodes Come1, Come2, Come3, . . . arranged in the manner of stripes in the common electrode COME and detection electrodes Dete1, Dete2, Dete3, . . . arranged in the manner of stripes in the detection electrode DETE are spaced from each other. Thus, basically, capacitors Cc are present between the common electrodes Come1, Come2, Come3, . . . and the detection electrodes Dete1, Dete2, Dete3, . . . .

The common electrodes Come1, Come2, Come3, . . . are scanned by drive pulses Tx at predetermined intervals. If the user's finger is close to the detection electrode Dete2, when a drive pulse is supplied to the common electrode Come2, a pulse is obtained from the detection electrode Dete 2, which is lower in level than pulses obtained from the other detection electrodes arranged in the manner of stripes. The detection electrode DETE is used to monitor a fringing field from a Tx electrode. To be more specific, when a conductive object such as a finger is brought close to the Tx electrode, it intercepts the fringing field. If the fringing field is intercepted, the potential detected by the detection electrode DETE is reduced.

In the mutual detection method, a detection-potential difference made by the above reduction of the potential can be handled as a detection pulse for a position DETP.

The above capacitance Cx varies in accordance with whether the finger is close to or far from the detection electrode DETE. Thus, the level of the detection pulse also varies in accordance with whether the user's finger is close to or far from the detection electrode DETE. It is therefore possible to determine from the level of the detection pulse how close the finger is to the flat surface of the touch panel. Needless to say, a two-dimensional position of the finger on the flat surface of the touch panel can be detected based on an electrode driving timing of the drive pulse Tx and an output timing of the detection pulse.

FIGS. 9A and 9B are views schematically showing the structure of the display device DSP with the sensor according to the first embodiment. FIG. 9A is a cross-sectional view of the display device DSP with the sensor, and FIG. 9B is a plan view showing the structure of the sensor.

As shown in FIG. 9A, the display device DSP with the sensor comprises an array substrate AR, a counter-substrate CT and the liquid crystal layer LQ held between the array substrate AR and the counter-substrate CT.

In the following explanation, in order to simplify it, the common electrodes Come1, Comet, Come3, . . . arranged in the manner of stripes are referred to as common electrodes COME, and the detection electrodes Dete1, Dete2, Dete3, . . . are referred to as detection electrodes DETE.

The array substrate AR comprises a TFT substrate 10 and the common electrode COME. The TFT substrate 10 comprises a transparent insulating substrate formed of glass or the like, switching elements not shown, various lines including source lines, gate lines, etc., and a flattening layer which is an insulating film covering those lines. The common electrode COME is provided on the TFT substrate 10 and covered by an insulating layer. The common electrodes included in the common electrode COME, for example, extend in the first direction, and are arranged in the manner of stripes in the second direction crossing the first direction. The common electrodes COME are formed of transparent electrode material such as indium tin oxide (ITO) or indium zinc oxide (IZO). In the first embodiment, the common electrodes COME are also used as drive electrodes for the sensor.

The counter-substrate CT comprises a transparent insulating substrate 20 such as glass, color filters CF, the detection electrode DETE and a polarizing plate PL. The color filters CF are covered by the overcoat layer OC. The detection electrode DETE is provided on a main outer surface of the transparent insulating substrate 20 (which is located opposite to the color filters CF). The detection electrodes included in the detection electrode DETE extend in a direction (second direction) crossing an extending direction (first direction) of the common electrodes, and are arranged in the manner of stripes in the first direction. The detection electrodes DETE are formed of transparent electrode material such as ITO or IZO. The polarizing plate PL is provided above the detection electrode DETE (on a side of the transparent insulating substrate 20 which is located opposite to the color filters CF).

FIG. 9B is a view for explaining a configuration example of the common electrode COME and the detection electrode DETE. In the display device DSP with the sensor according to the first embodiment, the detection method can be switched between the self-detection method and the mutual detection method. Furthermore, in the self-detection method, the common electrode COME and the detection electrode DETE detect the position of a touch (or proximity) in the second direction and that in the first direction, respectively. Also, in the mutual detection method, a drive pulse is input to the common electrode COME, and a detection pulse is obtained from the detection electrode DETE. It should be noted that with respect to the common electrode COME and the detection electrode DETE, a detection drive method and a method of effecting switching between the self-detection method and the mutual detection method will be described later.

In the display device DSP with the sensor according to the first embodiment, sensor electrodes (the common electrode COME and the detection electrode DETE) are featured in structure in that the common electrode COME has a vertical COME structure. This will be described in detail later.

FIGS. 10A and 10B are views for explaining driving methods of the self-detection method and the mutual detection method in the display device DSP with the sensor according to the first embodiment. As described above, since the common electrodes COME, which are used in displaying an image, are also used as electrodes for touch position detection, an image display operation and a touch position detection operation are performed in a time sharing manner.

In the mutual detection method as shown in FIG. 10A, a time period for processing is divided into time periods for displaying an image (hereinafter each referred to as an image display time period and time periods for detecting a touch position (hereinafter each referred to as a touch position detection time period), and in a single frame time period, image display time periods and touch position detection time periods are alternately applied. To be more specific, an operation for outputting image signals (SIGn) corresponding to respective colors in response to a signal (SELR/G/B) for selecting three colors of RGB is performed for a plurality of divided display lines, and thereafter a mutual detection operation in which drive pulses Tx are input to the common electrodes included in the common electrode COME is performed. That is, the plurality of divided display lines and the common electrodes included in the common electrode COME are successively subjected to the above operations.

In the self-detection method as shown in FIG. 10B, after an image of a single frame is displayed, a self-detection operation is performed by inputting drive pulses to all the common electrodes included in the common electrode COME. To be more specific, an operation for outputting image signals (SIGn) corresponding to respective colors in response to a signal (SELR/G/B) for selecting three colors of RGB is performed with respect to all the display lines, and thereafter the self-detection operation is performed by inputting drive pulses to all the common electrodes included in the common electrode COME.

It should be noted that in the self-detection method, a detection operation is not dividedly performed, i.e., it is performed in a single time period. This is because the sensitivity of the detection operation can be improved by obtaining data on the detection in the single time period. However, since in the self-detection method, the detection operation can be performed with a higher sensitivity than in the mutual detection method, it is not limited to that in the manner as shown in FIG. 10B; that is, it may be performed in a manner as shown in 10A.

Figure 11:
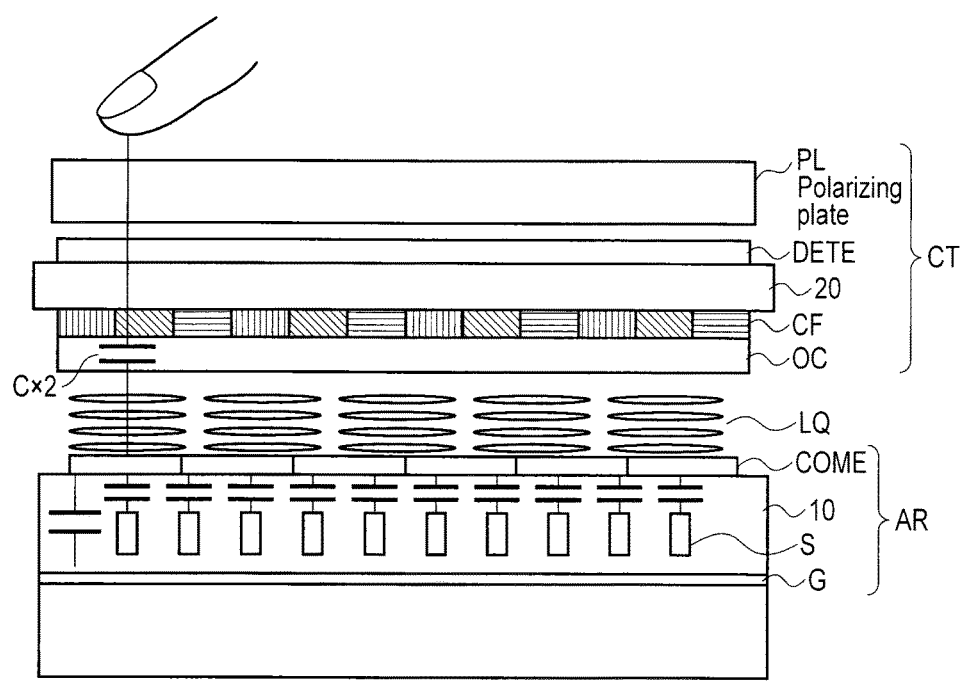
FIG. 11 is a view for explaining why a detection sensitivity of self-detection of the display device with the sensor according to the first embodiment is reduced.

FIG. 11 is a view for explaining why a detection sensitivity is reduced in the self-detection in the display device DSP with the sensor according to the first embodiment.

In the self-detection method as explained above, a capacitance Cx2 which the finger close to the electrode has influences a detection sensitivity. It should be noted that as shown in FIG. 11, since the common electrode COME is provided close to the source lines S and the gate lines G, parasitic capacitances between the common electrode COME and the source lines S and the gate lines G are very great, and greatly vary due to a film thickness difference, temperature, etc., thus causing a great error, and thus reducing the detection sensitivity. Furthermore, due to the presence of a great parasitic capacitance, the common electrode COME cannot be driven with a desired waveform having a good responsiveness. It was therefore hard to apply the common electrode COME to the self-detection method.

Figure 12:
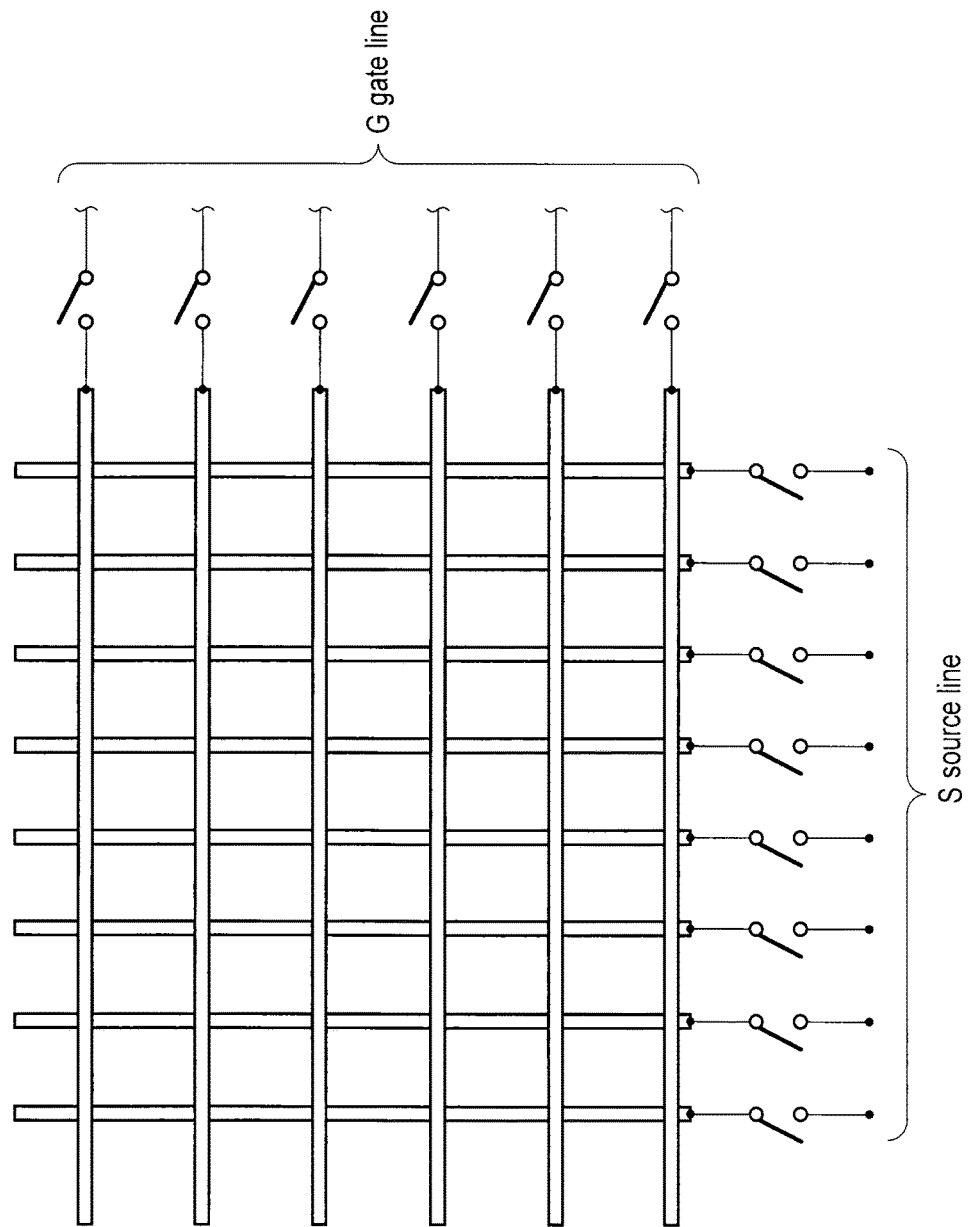
FIG. 12 is a view for explaining a method of reducing an influence of a parasitic capacitance in the self-detection in the display device with the sensor according to the first embodiment.

FIG. 12 is a view for explaining a method of reducing an influence of a parasitic capacitance in the self-detection in the display device DSP with the sensor according to the first embodiment.

As shown in FIG. 12, switches for connection with the gate lines G and switches for connection with the source lines S are provided, and during the touch position detection time period, the switches are opened to cause the gate lines G and the source lines S to be in a floating state. As a result, the influence of the parasitic capacitance is completely eliminated in principle, and thus the common electrode COME can be driven with a desired waveform.

FIGS. 13A and 13B are views for explaining another method of reducing the influence of the parasitic capacitance in the self-detection in the display device DSP with the sensor according to the first embodiment.

As shown in FIG. 13A, switches for connection with the gate lines G and switches for connection with the source lines S are provided, and during the touch position detection time period, the switches for connection with the gate lines G are opened to cause the gate lines G to be in a floating state. Then, as shown in FIG. 13B, identical waveforms synchronizing with the detection waveform of the common electrode COME are input to the source lines S. As a result, the influence of the parasitic capacitance is reduced to enable the common electrode COME to be driven with a desired waveform.

It is preferable that source lines S to which the identical waveforms synchronizing with the drive waveform are input be driven by physically short-circuiting the source lines S and common electrodes in the common electrode COME to which drive pulses having the above drive waveform are input. Normally, resistors in the electrode COME are formed of transparent electrodes (ITO, IZO) or the like, and have a higher resistance than that of source electrodes formed of metal. The above driving is performed by establishing a short-circuit, to thereby reduce the resistances of COME lines, and thus reduce the power consumption. A structure to be applied is not limited to the above structure. That is, identical waveforms synchronizing with the drive waveform may also be input to source lines S not associated with the above common electrodes in the common electrode COME.

FIGS. 14A and 14B are views for explaining a further method of reducing the influence of the parasitic capacitance in the self-detection in the display device DSP with the sensor according to the first embodiment.

As shown in FIG. 14A, switches for connection with the gate lines G and switches for connection with the source lines S are provided; and they are closed during the touch position detection time period. That is, the source lines S and the gate lines G are not made to float. Furthermore, as shown in FIG. 14B, identical waveforms synchronizing with the drive waveform for the common electrode COME are input to the gate lines G and the source lines S. Thereby, the common electrode COME can be driven with a desired waveform. It should be noted that signals for driving the gate lines G are made to have a waveform of a potential at which switching transistors can be kept non-conducting (in the off state). This is intended to prevent switching transistors provided at respective pixels from conducting (being made in the on state) to cause a leakage at the pixels and degrade a display quality due to the leakage.

It should be noted that in the case where identical waveforms synchronizing with the drive waveform are input to source lines S, they may be input to source lines S associated with common electrodes included in the common electrode COME to which drive pulses having the above drive waveform are input, or may be input to source lines S not associated with the common electrodes to which the drive pulses having the drive waveform are input.

Figure 15A:
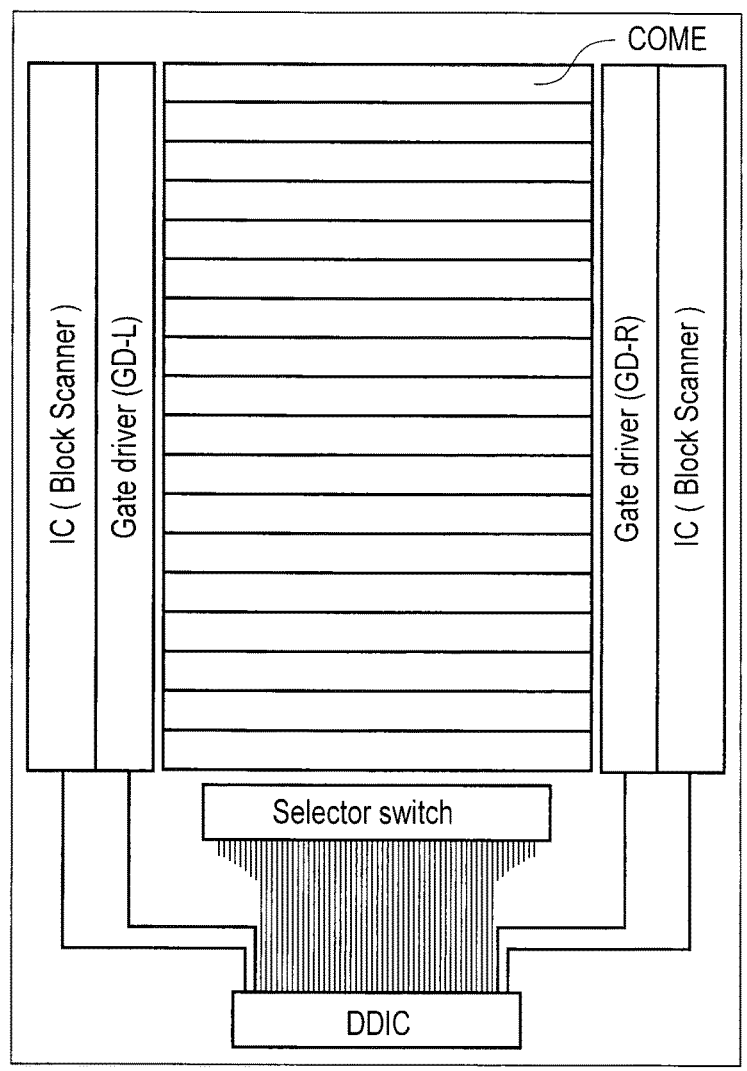
FIG. 15A is a plan view schematically showing structures of common electrodes and detection electrodes in a display device with a sensor, which was considered before consideration of the first embodiment.

FIG. 15A is a plan view schematically showing structures of common electrodes and detection electrodes in a sensor in a display device DSP with the sensor, which was considered before consideration of the first embodiment. FIG. 15B is a plan view schematically showing structures of the common electrodes and the detection electrodes in the sensor in the display device DSP with the sensor according to the first embodiment.

Referring to FIG. 15A, the common electrode COME and the source lines S are provided to intersect each other. Thus, in the self-detection method, lines from the common electrodes included in the common electrode COME extend laterally as shown in the figure, and ICs (black scanners) are provided at frame edge portions on both sides as shown in the figure. Thus, the frame edge portions each have a large size. On the other hand, in the display device DSP with the sensor according to the first embodiment, as shown in FIG. 15B, the common electrodes included in the common electrode COME are provided to extend parallel to the source lines S. Thus, the lines from the common electrodes included in the common electrode COME can be extended toward an FPC side as shown in the figure (in an extension of the source lines S). Therefore, in the first embodiment, ICs (block Scanners) do not need to be provided at frame edge portions on both sides as shown in the figure, and the frame edge portions are thus made smaller.

If the common electrodes for use in displaying an image are used as electrodes for the self-detection method, it is necessary to further provide lines for supplying a detection signal from the common electrodes. Thus, a frame edge of a liquid crystal element is greatly widened, as a result of which the number of liquid panels to be obtained from a mother sheet is decreased. In addition, this runs counter to a demand for narrower frame edges, which is made in view of a set design.

In the first embodiment, sensor lines from the common electrodes included in the common electrode COME are provided to extend to a switching portion 40 provided on the FRC side of the array substrate AR (on an extension of each of the source lines S), without extending through the frame edge portions. The switching portion 40 switches the signal lines to be connected to the common electrodes included in the common electrode COME in accordance with an operation mode (a display mode, a mutual detection mode or a self-detection mode) of the display portion. Furthermore, the switching portion 40 is connected to a touch IC (TP-IC) for touch processing which is provided outward of the detection electrode DETE, with a flexible printed circuit (FPC) interposed between the switching portion 40 and the touch IC (TP-IC). Also, the sensor lines from the detection electrodes included in the detection electrode DETE are connected to the touch IC (TP-IC). In such a manner, in the first embodiment, ICs (block scanners) for touch drive do not need to be provided on both sides as shown in the figure, and the frame edge portions can be further narrowed, as compared with the structure as shown in FIG. 15A.

Furthermore, in the first embodiment, during the touch position detection time period, the common electrodes included in the common electrode COME are electrically connected in parallel with the source lines S. This structure will be explained in detail later. By virtue of the structure, the resistances of the common electrodes included in the common electrode COME, which are sensor lines, can be reduced.

Then, the structure and operation of a circuit for achieving the above sensor driving operation will be explained.

FIG. 16 is a block diagram of the structure of a circuit related to switching between signals in each of operation modes in the display device DSP with the sensor according to the first embodiment.

As described above, the common electrodes included in the common electrode COME extend in the second direction Y and are arranged apart from each other in the first direction X. To be more specific, if a single common electrode is associated with a single block, blocks associated with the common electrodes included in the common electrode COME are arranged in the first direction X. Furthermore, a plurality of pixels are associated with each of the common electrodes included in the common electrode COME. That is, a group of pixels in a given single block are associated with a common electrode associated with the single block. FIG. 16 shows a common electrode associated with a block j and a group of pixels in the block j; and a common electrode associated with a block j+1 and a group of pixels in the block j+1.

As shown in FIG. 16, source lines S are used in supplying image signals to pixels and thus connected to the pixels, with a source-line float portion 31 interposed between the source lines S and the pixels. In the source-line float portion 31, switches are provided for the source lines S as switches which effect switching between connection and disconnection of the source lines S, and opening and closing operations of the switches are controlled with source-line connection/disconnection signals SEL1 and SEL2. It should be noted that FIG. 16 shows a structure of a two-column selection method in which one source line S is connected to two columns of pixels; however, the method to be applied is not limited to the two-column selection method. That is, an arbitrary selection method such as a one-column selection method or a three-column selection method can also be applied. Also, it should be noted that when a source line S is disconnected by an associated switch, it floats.

As shown in FIG. 16, gate lines G are connected to a gate-line float portion 30. Furthermore, the gate-line float portion 30 is supplied with a gate-off signal (Gate_Off). In the gate-line float portion 30, AND circuits are provided for respective rows of pixels, and output signals which are logical products (AND) of gate signals and gate-off signals (Gate_Off) are input to pixels arranged in the first direction X. In the first embodiment, when the gate-off signal (Gate_Off) is made in the on state, the gate line G in the floating state.

It should be noted that FIG. 16 shows two rows of pixels and two blocks as a matter of convenience for explanation; however, actually, source-line float portions 31 and gate-line float portions 30 are provided for all blocks and all rows of pixels.

Then, the structure of a circuit as shown in a lower portion of FIG. 16 will be explained.

A common electrode corresponding to a block j is connected to one end of each of block-j mode changeover switches 41j and 42j. The other end of the block-j mode changeover switch 41j is connected to the touch IC (TP-IC). The block-j mode changeover switch 41j is closed (to be in the connected state) by a self-mode signal (Self_EN) in a self-detection mode. To be more specific, in the self-detection mode, a self-sensing pulse (SSP) from the touch IC (TP-IC) is supplied to the common electrode COME through the self-sensing pulse terminal (TSSP). As a result, the touch IC (TP-IC) can directly control the common electrode COME as a self-detection sensor.

On the other hand, the block-j mode changeover switch 42j is closed (to be in the connected state) by a self-mode signal (Self_EN) in a mutual detection mode or an image display mode. The other end of the block-j mode changeover switch 42j is connected to a supply line for a direct-current drive signal (VCOMDC) through a block-j direct-current select switch 43j, and also to a supply line for an alternating-current drive signal (TSVCOM) through a block-j alternating-current select switch 44j. The block-j direct-current select switch 43j is closed (to be in the connected state) by a block-j selection portion 45j in the image display mode to supply the direct-current drive signal (VCOMDC) to the common electrode COME. The block-j alternating-current select switch 44j is closed (to be in the connected state) in the mutual detection mode by the block-j selection portion 45j to supply the alternating-current drive signal (TSVCOM), i.e., drive pulses Tx, to the common electrode COME.

The block-j selection portion 45j comprises a shift register and an output buffer, and shifts an input direct-current select signal (VCOMSEL) in synchronism with a clock (not shown) in the mutual detection mode. The block-j alternating-current select switch 44j is kept closed (in the connected state) until the direct-current select signal (VCOMSEL) is input to a block-(j+1) selection portion 45j+1 which is subsequent to the block-j selection portion 45j. In such a manner, common electrodes included in the common electrode COME, to which drive pulses Tx are to be input, are selected.

It should be noted that the block j+1 has the same circuit configuration as the block j, and its explanation will be omitted.

FIG. 17 is a timing chart showing an operation of the self-detection mode of the display device DSP with the sensor according to the first embodiment.

If the self-detection mode is selected as the touch detection mode, when the touch position detection time period starts at time T1, a precharge voltage is set for an image display signal Sn. At this time, source-line connection/disconnection signals SEL1 and SEL2 are made in the on state, and the precharge voltage (e.g., a low-level voltage) is applied to the source lines S. This is intended to eliminate an influence of a residual voltage in the source lines S when the common electrode COME is vibrated by a drive pulse having a drive waveform.

At time T2, the source-line connection/disconnection signals SEL1 and SEL2 are made in the off state. Thereby, the source lines S float. On the other hand, at time T2, the gate-off signal (Gate_Off) is made in the on state. As a result, the gate lines G are made in the floating state. Furthermore, at time T2, a self-mode signal (Self_EN) is to be in the on state. As a result, mode changeover switches 41 for all blocks are closed (i.e., made in a conductive state) (mode changeover switches 42 are opened, i.e., made in the disconnected state), and the common electrodes COME are connected to the touch IC (TP-IC), which is provided externally. The touch IC (TP-IC) directly inputs self-sensing pulses (SSPs) to the common electrodes COME through self-sensing pulse terminals (TSSP) to perform a detection operation.

At time T3, the touch position detection time period ends (the displaying time period starts), the gate-off signal (Gate_Off) is to be in the off state, and the gate lines G stop floating. Furthermore, the self-mode signal (Self_EN) is to be in the off state, and the switches operate to supply the direct-current drive signal (VCOMDC) to the common electrodes COME. Furthermore, the source-line connection/disconnection signals SEL1 and SEL2 are to be in the on state to connect the source line S and pixels to each other and stop floating of the source line S.

FIG. 18 is a block diagram showing a structure of a circuit related to signal switching in each of the operation modes in a modification of the display device DSP with the sensor according to the first embodiment.

Unlike the circuit as shown in FIG. 16, in the circuit as shown in FIG. 18, with respect to each of blocks, a self-mode signal (Self_EN) is also input to a block selection portion 45. Furthermore, although a mode changeover switch 41 is provided, no mode changeover switch 42 is provided. The block selection portion 45 causes a direct current select switch 43 and an alternating current select switch 44 to be opened, when the self-mode signal (Self_EN) is to be in the on state. On the other hand, when the self-mode signal (Self_EN) is to be in the on state, the mode changeover switch 41 is closed (to be in the conductive state), and an associated common electrode COME is connected to the touch IC (TP-IC), which is externally provided. The operation of the circuit of the above modification is the same as that of the circuit as shown in FIG. 16, and its explanation will be omitted. In the circuit of the modification, the number of switches to be provided can be decreased.

FIG. 19 is a block diagram showing a structure of a circuit related to signal switching in each of operation modes in a display device DSP with a sensor, according to another modification of the first embodiment. Referring to FIG. 19, a further circuit is provided and connected in parallel with a source line S and an associated common electrode COME in the touch position detection time period. Structural elements identical to those in the first embodiment will be denoted by the same reference numerals as in the first embodiment, and their detailed explanations will be omitted. FIG. 19 shows only a circuit for a block j in order that an explanation be simplified, and circuits for the other blocks have the same structure as the circuit for the block j. It should be noted that the states of contact points of switches as shown in FIG. 19 are those when the self-detection mode is applied.

The common electrodes COME extend in a vertical direction (the second direction Y), and arranged apart from each other in a lateral direction (the first direction X). To be more specific, if a single common electrode COME is associated with a single block, common electrodes COME associated with blocks are arranged in the first direction X. Furthermore, a single common electrode COME is associated with a plurality of pixels. That is, a group of pixels in a single block are associated with the common electrode COME associated with the single block.

Source lines S are used in supplying an image signal to pixels and connected to the pixels through a source-line float portion 31. In the source-line float portion 31, switches for effecting switching between connection and disconnection of the source lines S are provided for the source lines S, and opening and closing operations of those switches are controlled with source-line connection/disconnection signals SEL1 and SEL2.

Furthermore, referring to FIG. 19, a direct-current drive signal (VCOMDC) is input to an upper part of the associated common electrode COME through a source-line connecting portion 50. In the source-line connecting portion 50, switches are provided to supply a direct-current select signal (VCOMSEL) to switch the following modes: a mode of supplying the direct-current drive signal (VCOMDC) to the associated common electrode COME; and a mode of connecting the source line S and the common electrode COME in parallel with each other. In the state as shown in FIG. 19, the direct-current drive signal (VCOMDC) is not supplied to the common electrode COME, and source lines S and the common electrode COME are connected together.

Gate lines G are connected to the gate-line float portion 30. Furthermore, to the gate-line float portion 30, a gate-off signal (Gate_Off) is input. In the gate-line float portion 30, AND circuits are provided for respective rows, a logical product of a gate signal and the gate-off signal (Gate_Off) is input as an output signal to pixels arranged in the first direction X. In the other above modification of the first embodiment, when the gate-off signal (Gate_Off) is to be in the on state, the gate line G floats.

Next, a structure of a circuit as shown in a lower portion of FIG. 19 will be explained.

The common electrode COME which is associated with the block j is connected to one of ends of the block-j mode changeover switch 41j. The other end of the block-j mode changeover switch 41j is connected to the touch IC (TP-IC). In the self-detection mode, the block-j mode changeover switch 41j is closed (to be in the connected state) by the self-mode signal (Self_EN). To be more specific, in the self-detection mode, a self-sensing pulse (SSP) from the touch IC (TP-IC) is supplied to the above associated common electrode COME through the self-sensing pulse terminal (TSSP). Thus, the touch IC (TP-IC) can directly control the common electrode COME as a self-detection sensor.

Furthermore, the common electrode COME of the block j is also connected to one-end portions of direct-current select switches 46. Switching of the direct-current select switches 46 is effected by the direct-current select signal (VCOMSEL). In the detection mode, the switching of the direct-current select switches 46 is effected to cause the common electrode COME and source lines S to be connected to each other, and in the image display mode, the switching of the direct-current select switches 46 is effected to cause the direct-current drive signal (VCOMDC) to be input to the common electrode COME.

Thus, in the self-detection mode, the source lines S and the common electrode COME of the block j are electrically connected in parallel with each other through the source-line connecting portion 50 and the direct-current select switches 46, and thus the self-sensing pulse (SSP) is supplied to the source lines S and the common electrode COME of the block j at the same time. Furthermore, at this time, as shown in FIG. 19, the common electrode COME of the block j is connected to ground lines (TSIG1, TSIG2 and TSIG3) through block-j ground select switches 47j.

On the other hand, in the mutual detection mode, the block-j alternating-current select switch 44j is closed (to be in the connected state), and the block-j ground select switches 47j are opened. As a result, the alternating-current drive signal (TSVCOM), i.e., the drive pulse Tx, is supplied to the above common electrode COME.

The block-j selection portion 45j comprises a shift resistor and an output buffer, and in the mutual detection mode, shifts an input direct-current select signal (VCOMSEL) in synchronism with a clock (not shown). Until the direct-current select signal (VCOMSEL) is input to a block-(j+1) selecting portion at a subsequent stage, the block-j alternating-current select switches 44j are kept closed (in the connected state). Thereby, the common electrode COME in a block to which the drive pulse Tx is to be input is selected. Furthermore, in the self-detection mode, the block-j selection portion 45j closes the block-j ground select switches 47j (i.e., causes it to be in the connected state) in response to the self-mode signal (Self_EN), to connect the source lines S to a ground line.

Figure 20:
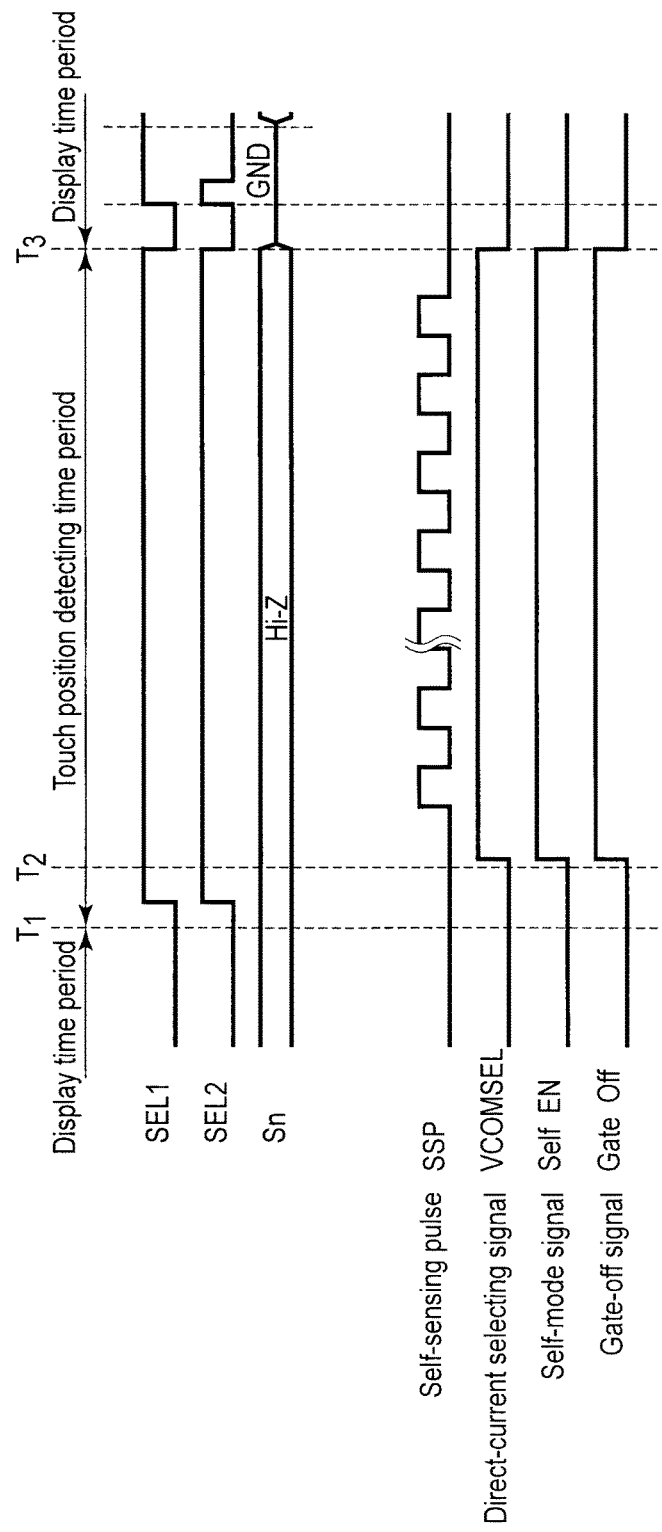
FIG. 20 is a timing chart showing an operation of a self-detection mode of the display device with the sensor according to the above other modification of the first embodiment.

FIG. 20 is a timing chart showing an operation of the self-detection mode of a display device DSP with a sensor according to another modification of the first embodiment.

In the case where the self-detection mode is selected as a touch detection mode, when the touch detection time period starts at the time T1, the source-line connection/disconnection signals SEL1 and SEL2 are to be in the on state. At this time, an image signal Sn is not output. At time T2, the source-line connection/disconnection signals SEL1 and SEL2 are kept in the on state. Thereby, the source lines S are kept connected to the pixels.

On the other hand, at time T2, the gate-off signal (Gate_Off) is to be in the on state. As a result, the gate lines G is in the floating state. Furthermore, at time T2, direct-current select signals (VCOMSEL) supplied in upper and lower regions corresponding to upper and lower portions of FIG. 19 are to be in the on state. As a result, switching of the direct-current select switches 46 is effected to connect the above common electrode COME and the source lines S. That is, the common electrode COME and the source lines S are connected to each other in the upper and lower regions. Also, the self-mode signal (Self_EN) is to be in the on state. As a result, the above common electrode COME is connected to the touch IC (TP-IC) provided externally, and the touch IC (TP-IC) directly inputs a self-sensing pulse (SSP) to the common electrode COME to perform the detection operation.

At time T3, when the touch detection time period ends (the display time period starts), the gate-off signal (Gate_Off) is to be in the off state, and the gate lines G stop floating. Further, the self-mode signal (Self_EN) is to be in the off state, and the above switching occurs such that a direct-current drive signal is supplied to the above common electrode COME. Furthermore, after to be in the off state once, the source-line connection/disconnection signals SEL1 and SEL2 are to be in the on state, and an image signal for display is supplied to the pixels through the source lines S.

It should be noted that in the circuit as shown in FIG. 19, identical vibration waveforms are input to the source lines S and the associated common electrode COME at the same time. Thus, a desired vibration waveform can be input to the common electrode COME. It should be noted that since the gate lines G float, identical vibration waveforms may be input to the gate lines G and the common electrode COME or no vibration waveforms may be input.

It should be noted that switching between the self-detection mode and the mutual detection mode can be effected, when a control unit (not shown) provided externally designates one of those detection modes as an appropriate mode with a self-mode signal (Self_EN), after for example, checking a detected state of the touch sensor. How to use this switching between the self-detection mode and the mutual detection mode can be determined in accordance with various usage of the display device with the sensor.

Second Embodiment

The second embodiment is different from the first embodiment in structure of the common electrode COME. Thus, structural elements identical or similar to those in the first element electrodes will be denoted by the same structural elements as in the first embodiment, and their explanations will be omitted.

Figure 21:
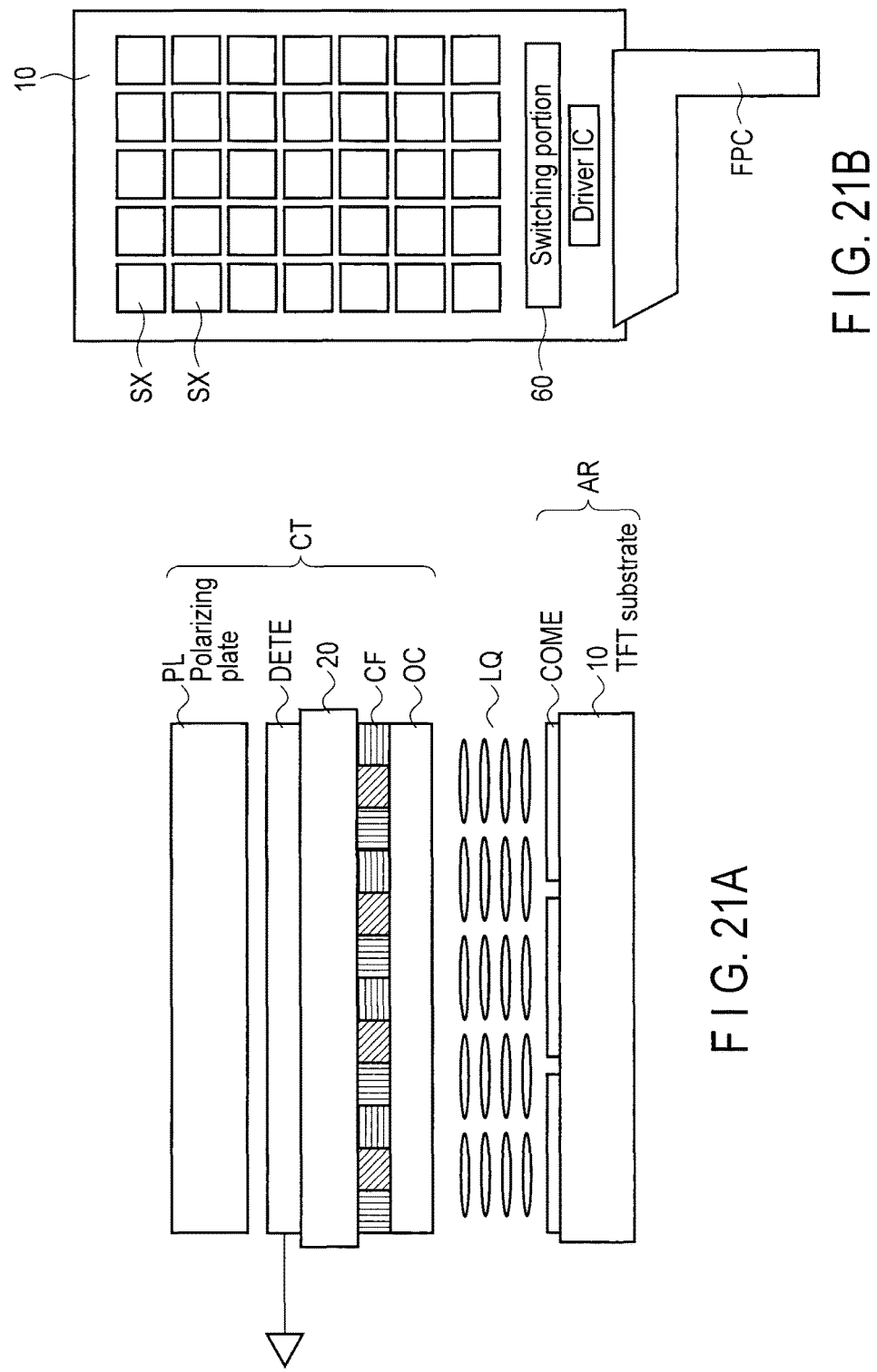
FIG. 21A is a view schematically showing a structure of a sensor in a display device with the sensor according to a second embodiment.
FIG. 21B is another view schematically showing the structure of the display device with the sensor according to the second embodiment.

FIGS. 21A and 21B are views schematically showing a structure of a display device DSP with a sensor according to the second embodiment. FIG. 21A is a cross-sectional view of the display device DSP with the sensor, and FIG. 21B is a plan view showing a structure of the sensor.

As shown in FIG. 21A, the display device DSP with the sensor comprises an array substrate AR, a counter-substrate CT, and a liquid crystal layer LQ held between the array substrate AR and the counter-substrate CT. The counter-substrate CT comprises a transparent insulating substrate 20 formed of glass or the like, a color filter CF, a detection electrode DETE and a polarizing plate PL. The structure of the counter-substrate CT is the same as that in the first embodiment. The array substrate AR comprises a TFT substrate 10 and a common electrode COME. With respect to the array substrate AR, the structure of the common electrode COME is different from that in the first embodiment as described below. It should be noted that the common electrode COME also functions as a sensor which detects a variation of a capacitance as in the first embodiment.

As shown in FIG. 21B, the common electrode COME comprises a plurality of electrodes SX which are electrically independent of each other. The electrodes SX are provided on the TFT substrate 10 and arranged in a matrix along the first direction X and the second direction Y. In the second embodiment, each of the electrodes SX is formed of a transparent conductive material such as ITO or IZO.

In the second embodiment, each of the electrodes SX is rectangular. One of sides of each electrode SX has a length of 9 mm or less, preferably 4-5 mm. This is intended to detect a touch of a finger with a high precision in consideration of a size of finger which is approximately 9 mm□. Furthermore, it is preferable that in both vertical and horizontal directions, the gap between any adjacent two of the electrodes SX be 10 microns or less. This is determined in consideration of space for source lines S, gate lines G and lead lines (not shown) for electrically connecting the electrodes SX and a switching portion 60.

FIG. 22 is a view showing a detailed structure of the sensor of the display device DSP with the sensor according to the second embodiment.

In regions covered by the electrodes SX, a plurality of pixel electrodes PE are provided, and arranged in the row and column directions. Between pixel electrodes PE arranged adjacent to each other in the row direction, lead lines 62 are provided to extend in the column direction. Also, each of the lead lines 62 is electrically connected to a respective one of the electrodes SX by at least one contact portion 61. In such a manner, the lead lines 62 connected to the electrodes SX, respectively, are connected to a switching portion 60.

FIGS. 23A and 23B are enlarged views showing the detailed structure of the display device DSP with the sensor according to the second embodiment. FIG. 23A is an enlarged plan view showing the structure of the sensor, and FIG. 23B is an enlarged cross-sectional view of the array substrate AR in the display device DSP with the sensor, which is taken along a cutting-plane line XX'.

As shown in FIG. 23B, an interlayer film formed of an insulating film (an organic film PLN in the case shown in the FIG. 23B) is provided to cover the source lines S, and pixel electrodes PE formed of transparent conductive material such as ITO or IZO are provided on the interlayer film. Furthermore, inter-electrode insulating films formed of inorganic insulating film PIL are provided to cover the pixel electrodes PE. The electrodes SX, which are formed of transparent conductive material such as ITO or IZO, are formed on the inter-electrode insulating films PIL. On the other hand, between the adjacent pixel electrodes PE, the lead lines 62, which are formed of metallic material, are provided to extend in the column direction, and also covered by the inter-electrode insulating film PIL. In each of the lead lines 62, at least one contact portion 61 formed of metallic material is provided in an appropriate position. Thus, contact portions 61 electrically connect the lead lines 62 and the electrodes SX, respectively.

Next, with reference to FIGS. 16, 18 and 19, it will be explained how the display device DSP with the sensor according to the second embodiment is operated with the electrodes SX having the above structure.

[Operation According to the Self-Detection Method]

When the display device DSP with the sensor is operated in the self-detection mode, touch detection is performed by operating only the electrodes SX in the self-detection mode without using the detection electrode DETE. The switching portion 60 switches the lead lines 62 to cause the electrodes SX to function as block common electrodes COME, respectively. Then, it connects the electrodes SX to block mode changeover switches 41, respectively. Thereby, the electrodes SX and the touch IC (TP-IC) are electrically connected to each other, and thus a touch drive operation can be performed in the self-detection mode by self-sensing pulses (SSP) from the touch IC (TP-IC).

It should be noted that the self-sensing pulses (SSP) in the self-detection, as shown in FIG. 22, are supplied to the electrodes SX through the lead lines 62 provided between the pixel electrodes, respectively. To be more specific, the block common electrodes COME as shown in FIGS. 16, 18 and 19 correspond to the electrodes SX, respectively, and the number of block common electrodes COME which supply self-sensing pulses (SSP) is increased, as compared with the structure according to the first embodiment. Inevitably, the number of block mode changeover switches 41 to be switched by the switching portion 60 is also increased in accordance with increasing of the number of the electrodes SX.

The lead lines 62 are provided between the adjacent pixels as shown in FIG. 22, and the number of regions between adjacent pixels, in which lead lines 62 are not provided, is also increased or decreased in accordance with the number of the electrodes SX.

It should be noted that in the operation in the self-detection mode, it is possible that self-sensing pulses (SSP) are supplied to all the electrodes SX at the same time to perform sensing with all the electrodes, or it is also possible that the electrodes SX are divided into groups, and self-sensing pulses (SSP) are supplied to the groups in a time sharing manner to perform self-sensing.

[Operation According to the Mutual Detection Method]

When the display device DSP with the sensor is operated in the mutual detection mode, it is operated to cause the electrodes SX to function as common electrodes COME in the common electrode COME to which drive pulses Tx are to be input, and to obtain detection pulses Rx with detection electrodes DETE. The switching portion 60 electrically connects lead lines 62 from electrodes SX arranged in the same column such that the electrodes SX are connected in series to each other in the column direction. Then, the lead lines 62 in each of columns are connected to the mode changeover switches 42 in an associated one of the blocks, or the electrodes SX arranged in the same column are driven at the same time. Thereby, an alternating-current drive signal TSVCOM can be input to the electrodes SX arranged in the column direction (the same column) to perform the touch drive operation in the mutual detection mode.

It should be noted that in the mutual detection method, the electrodes SX are connected in series to each other in the column direction, and made in the same manner as the block common electrodes COME in the first embodiment. Therefore, it suffices that since the alternating-current drive signal TSVCOM is also input to the electrodes SX connected in series to each other, the mode changeover switches 42, the alternating current select switch 44, the block selection portion 45j, etc., as shown in FIGS. 16, 18 and 19 are made to have the same structures as those in the first embodiment.

[Operation in the Display Mode]

When the display device DSP with the sensor is operated in the display mode, the electrodes SX are given a common voltage Vcom, and caused to operate as common electrodes COME. The switching portion 60 electrically connects lead lines 62 from electrodes SX arranged in the same column such that the electrodes SX are connected in series to each other in the column direction. Then, in each of the columns, lead lines 62 are connected to the mode changeover switch 42 in an associated one of the blocks. Alternatively, the electrodes SX arranged in the same column are driven at the same time. Thereby, a direct-current drive signal VCOMDC is input to the electrodes SX arranged in the same column to perform a display operation with a driver IC.

It should be noted that in the display mode, the electrodes SX are connected in series to each other in the column direction, and are made in the same manner as the block common electrodes COME in the first embodiment. Therefore, it suffices that since the direct-current drive signal VCOMDC is input to the electrodes SX connected in series to each other in the column direction, the mode changeover switches 42, the direct current select switch 43, the block selection portion 45j, etc., as shown in FIGS. 16, 18 and 19, are made to have the same structure as those in the first embodiment.

It should be noted that in the second embodiment, in the self-detection mode, only the electrodes SX are used without using the detection electrode DETE, and thus the great distance between the finger and the electrodes SX might cause a problem. Therefore, the detection electrodes DETE (detection electrodes Dete1, Dete2, Dete3, . . . ), which are arranged in the manner of stripes, are made thinner to improve the sensitivity of the electrodes SX. According to a research made by the inventors, the detection electrodes Dete1, Dete2, Dete3, . . . arranged in the shape of stripes each have a width of 1-10 microns, preferably 5 microns, and the distance between adjacent detection electrodes Dete1, Dete2, Dete3, . . . is 1-10 mm, preferably 5 mm. For example, the detection electrodes Dete1, Dete2, Dete3, . . . arranged in the manner of stripes can also be provided between the electrodes SX shown as a plan view of the display device DSP with the sensor.

It should be noted that in the self detection in the display device DSP with the sensor according to the second embodiment, the influence of the parasitic capacitance can be reduced as in the first embodiment. That is, as explained above with reference to FIGS. 12-14, the influence of the parasitic capacitance in the self-detection time period can be reduced by performing the following operations in combination with each other as appropriate: causing the gate lines G and the source lines S to be in the floating state; and inputting of identical waveforms synchronizing with the drive waveform of the common electrode COME.

Furthermore, the display device DSP with the sensor according to the second embodiment is operated such that the electrodes SX are connected in series to each other in the column direction to form the common electrode COME; however, the electrodes SX can also be connected in series to each other in the row direction to form the common electrode COME. This structure in which the electrodes SX are connected in series to each other in the row direction corresponds to the structure of the display device DSP with the sensor as shown in FIG. 15A. In this case, the detection electrodes DETE are provided to extend in the vertical direction. In this case, it suffices that a drive circuit is formed compliant with the structures as shown in FIGS. 16, 18 and 19. Also, with respect to the method of reducing the parasitic capacitance, it suffices that causing the gate lines G and the source lines S to be in the floating sate and inputting of identical waveforms synchronizing with the drive waveform of the common electrode COME are applied in combination as appropriate. Thereby, it is possible to achieve a similar operation to that in the second embodiment.

In the display device with the sensor according to each of the above embodiments, even if an in-cell type display device is adopted, the self-detection method can be applied. Furthermore, switching between the self-detection method and the mutual detection method can be appropriately effected in accordance with how to use the display device.

Those functions may be applied to a circuit on glass of the TFT, and frame edge portions can be made smaller, since space, etc. on the FPC side of a driver IC can be effectively used. If a scanner circuit is incorporated into a drive IC, it is also possible to provide a liquid crystal element including frame edges which are substantially the same as those in a crystal element not having a touch function. Furthermore, if it is set that a detection signal of mutual self is sent by a touch IC which detects a touch, only the number of lines to be added is increased without the need to provide a scanner circuit, etc. This is a great advantage.

All display devices which can be put to practical use by a person with ordinary skill in the art by changing as appropriate the designs of the display devices according to the above embodiments are covered by the disclosure of the present application with respect to the present invention, as long as they are made to have the subject matter of the present invention.

It can be understood that various modifications of the embodiments of the present invention can be conceived by a person with ordinary skill in the art, and also fall within the scope of disclosure of the present application with respect to the present invention. For example, with respect to the above embodiments, if a person with ordinary skill in the art adds or deletes a structural element or changes a design as appropriate, or adds or omits a step or changes a design, a modification obtained by such a change also falls within the scope of disclosure of the present application with respect to the present invention, as long as it has the subject matter of the present invention.

In addition, in addition to the above advantages obtained by the above embodiments, if another or other advantages can be obviously considered to be obtained by the embodiment or embodiments from the specification or can be conceived as appropriate by a person with ordinary sill in the art from the specification, it is understood that such another or other advantages can also be obtained by the present invention.

It is also possible to make various inventions by combining as appropriate the structural elements as disclosed with respect to the above embodiments. For example, some of the structural elements in the embodiments may be deleted. Also, structural elements used in both the embodiments may be combined as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device provided with a sensor, comprising:
a pair of electrodes for a touch sensor, which are provided to extend to intersect; and
a display panel which includes a plurality of display elements arranged in a matrix, a plurality of gate lines extending along display elements of the plurality of display elements which are arranged in a row direction, and a plurality of source lines extending along display elements of the plurality of display elements which are arranged in a column direction, wherein
common electrodes for display which are provided in the display panel are also used as one of the electrodes for the touch sensor,
the electrodes for the touch sensor are selectively driven by one of a self-detection method and a mutual detection method,
an image display operation of the display panel and a driving operation of the electrodes for the touch sensor are performed in a time sharing manner,
the common electrodes are located parallel to the source lines in the display panel, and extend continuously over pixels in a same direction as a direction in which the source lines extend,
when the common electrodes are driven by the self-detection method,
the gate lines provided in the display panel are switched to a floating state;
the source lines are driven by a signal identical to a drive signal supplied to the common electrodes; and
the common electrodes and the source lines are electrically connected and driven,
the display device provided with the sensor further includes circuits, each of which supplies the drive signal to a corresponding common electrode of the common electrodes,
each of the circuits includes:
a first switch configured to switch a connection between the corresponding common electrode and a touch panel integrated circuit;
a second switch configured to switch a connection between the corresponding common electrode and an alternating-current signal line;
a third switch configured to switch a connection between the corresponding common electrode and a direct-current signal line; and
a fourth switch configured to switch a connection between the corresponding common electrode and the source lines,
in the self-detection method, in each of the circuits, the corresponding common electrode and the source lines are connected via the fourth switch, and the drive signal is input to the corresponding common electrode from the touch panel integrated circuit via the first switch, and
in the mutual detection method,
the drive signal is input sequentially from the circuits to the common electrodes;
in a circuit of the circuits which outputs the drive signal, the corresponding common electrode and the source lines are connected via the fourth switch, and an alternating-current signal is input to the corresponding common electrode from the alternating-current signal line via the second switch; and
in a circuit of the circuits which does not output the drive signal, the corresponding common electrode and the source lines are disconnected by the fourth switch, and a direct-current signal is input to the corresponding common electrode from the direct-current signal line via the third switch.

2. The display device provided with the sensor according to claim 1, further comprising a switching circuit configured to effect, when the display device is operated in one of an image display mode, a self-detection mode, and a mutual detection mode, switching to source lines associated with the one of the modes, to supply a signal to the common electrodes.

3. The display device provided with the sensor according to claim 2, wherein the switching circuit is provided at an end portion of the display panel in an extending direction of the common electrodes.

4. A method of driving a display device provided with a sensor, which comprises: a pair of electrodes for a touch sensor, which are provided to extend to intersect; and a display panel which includes a plurality of display elements arranged in a matrix, a plurality of gate lines extending along display elements of the plurality of display elements which are arranged in a row direction, and a plurality of source lines extending along display elements of the plurality of display elements which are arranged in a column direction, the method comprising:
using common electrodes for display, which are provided in the display panel, as one of the electrodes for the touch sensor;

selectively driving the electrodes for the touch sensor by one of a self-detection method and a mutual detection method; and performing an image display operation of the display panel and a drive operation of the electrode for the touch sensor in a time sharing manner, wherein the common electrodes are located parallel to the source lines in the display panel, and extend continuously over pixels in a same direction as a direction in which the source lines extend, when the common electrodes are driven by the self-detection method,
   the gate lines provided in the display panel are switched to a floating state;
   the source lines are driven by a signal identical to a drive signal supplied to the common electrodes; and
   the common electrodes and the source lines are electrically connected and driven, the display device provided with the sensor further includes circuits, each of which supplies the drive signal to a corresponding common electrode of the common electrodes, each of the circuits includes:
   a first switch configured to switch a connection between the corresponding common electrode and a touch panel integrated circuit;
   a second switch configured to switch a connection between the corresponding common electrode and an alternating-current signal line;
   a third switch configured to switch a connection between the corresponding common electrode and a direct-current signal line; and
   a fourth switch configured to switch a connection between the corresponding common electrode and the source lines, in the self-detection method, in each of the circuits, the corresponding common electrode and the source lines are connected via the fourth switch, and the drive signal is input to the corresponding common electrode from the touch panel integrated circuit via the first switch, and in the mutual detection method,
   the drive signal is input sequentially from the circuits to the common electrodes;
   in a circuit of the circuits which outputs the drive signal, the corresponding common electrode and the source lines are connected via the fourth switch, and an alternating-current signal is input to the corresponding common electrode from the alternating-current signal line via the second switch; and
   in a circuit of the circuits which does not output the drive signal, the corresponding common electrode and the source lines are disconnected by the fourth switch, and a direct-current signal is input to the corresponding common electrode from the direct-current signal line via the third switch.

5. A display device provided with a sensor, comprising:
a display panel which includes a plurality of display elements arranged in a matrix, a plurality of gate lines extending along display elements of the plurality of display elements which are arranged in a row direction, and a plurality of source lines extending along display elements of the plurality of display elements which are arranged in a column direction; and
a plurality of electrodes for a touch sensor, which are incorporated in the display panel and also provided in both upper and lower surfaces of the display panel, wherein:
the electrode for the touch sensor provided in the upper surface of the display panel includes electrodes arranged in a manner of stripes and extending in a single direction;
the electrode for the touch sensor provided in the lower surface of the display panel includes a plurality of detection electrodes arranged in a matrix and lead lines connected to the detection electrodes, respectively;
the electrode for the touch sensor provided in the lower surface of the display panel is also used as a common electrode for display which is provided in the display panel;
an image display operation of the display panel and a drive operation of the electrodes for the touch sensor are performed in a time sharing manner;
the display device with the sensor is selectively driven by one of a self-detection method and a mutual detection method in a single frame time period with at least one of the plurality of electrodes for the touch sensor;
in the self-detection method, a detection operation is performed in each of the detection electrodes in the lower surface of the display panel;
in the mutual detection method, a detection operation is performed with a plurality of electrodes of the detection electrodes in the electrode for the touch sensor provided in the lower surface, which are electrically connected in series in the column direction and are arranged in a manner of stripes, and also a plurality of electrodes in the electrode for the touch sensor provided in the upper surface, which are provided to extend in the row direction, and are arranged in the manner of stripes;

when the detection electrodes are driven by the self-detection method,
   the gate lines provided in the display panel are switched to a floating state,
   the source lines are driven by a signal identical to a drive signal supplied to the detection electrodes, and
   the detection electrodes and the source lines are electrically connected and driven;

the display device provided with the sensor further includes circuits, each of which supplies the drive signal to a corresponding detection electrode of the detection electrodes;

each of the circuits includes:
   a first switch configured to switch a connection between the corresponding detection electrode and a touch panel integrated circuit,
   a second switch configured to switch a connection between the corresponding detection electrode and an alternating-current signal line,
   a third switch configured to switch a connection between the corresponding detection electrode and a direct-current signal line, and
   a fourth switch configured to switch a connection between the corresponding detection electrode and the source lines;

in the self-detection method, in each of the circuits, the corresponding detection electrode and the source lines are connected via the fourth switch, and the drive signal is input to the corresponding detection electrode from the touch panel integrated circuit via the first switch; and in the mutual detection method,
   the drive signal is input sequentially from the circuits to the detection electrodes,
   in a circuit of the circuits which outputs the drive signal, the corresponding detection electrode and the source lines are connected via the fourth switch, and an alternating-current signal is input to the corresponding detection electrode from the alternating-current signal line via the second switch, and in a circuit of the circuits which does not output the drive signal, the corresponding detection electrode and the source lines are disconnected by the fourth switch, and a direct-current signal is input to the corresponding detection electrode from the direct-current signal line via the third switch.

* * * * *

UNITED STATES PATENT AND TRADEMARK OFFICE
CERTIFICATE OF CORRECTION

Page 1 of 1

PATENT NO. : 9,785,283 B2
APPLICATION NO. : 14/601555
DATED : October 10, 2017
INVENTOR(S) : Koji Noguchi and Hiroshi Mizuhashi It is certified that error appears in the above-identified patent and that said Letters Patent is hereby corrected as shown below:

On the Title Page

Item (56), In the References Cited, FOREIGN PATENT DOCUMENTS section, the following references are added:

--CN    102906636 A    01/2013
TW    201227482    07/2012
CN    102375639    03/2012
CN    103279245    09/2013
TW    M464687    11/2013--

Signed and Sealed this
Twenty-ninth Day of October, 2019

Andrei Iancu
*Director of the United States Patent and Trademark Office*